(12) United States Patent
Nanba

(10) Patent No.: US 7,688,520 B2
(45) Date of Patent: Mar. 30, 2010

(54) ZOOM LENS SYSTEM AND CAMERA INCLUDING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/405,721

(22) Filed: Mar. 17, 2009

(65) Prior Publication Data

US 2009/0231726 A1  Sep. 17, 2009

(30) Foreign Application Priority Data

Mar. 17, 2008  (JP)  ............................ 2008-067546

(51) Int. Cl.
*G02B 15/14* (2006.01)

(52) U.S. Cl. .................. 359/687; 359/683; 359/715; 359/740; 359/774

(58) Field of Classification Search ......... 359/683–687, 359/715, 740, 771, 774
See application file for complete search history.

(56) References Cited

U.S. PATENT DOCUMENTS

| 6,633,437 | B1 | 10/2003 | Hoshi |
| 6,867,925 | B1 | 3/2005 | Sato |
| 6,972,909 | B2 * | 12/2005 | Hamano et al. ............. 359/687 |
| 7,167,320 | B2 | 1/2007 | Ohashi |
| 7,253,964 | B2 * | 8/2007 | Muratani .................... 359/687 |
| 7,253,965 | B2 * | 8/2007 | Shibayama et al. ......... 359/687 |
| 7,333,274 | B2 * | 2/2008 | Hozumi ..................... 359/687 |
| 7,492,524 | B2 * | 2/2009 | Ito ............................. 359/683 |
| 7,492,526 | B2 * | 2/2009 | Sato .......................... 359/687 |
| 2006/0146417 | A1 | 7/2006 | Hoshi |
| 2007/0229985 | A1 * | 10/2007 | Nakatani et al. ............ 359/774 |
| 2008/0130141 | A1 * | 6/2008 | Ishibashi .................... 359/774 |

FOREIGN PATENT DOCUMENTS

| JP | 2000-347102 A | 12/2000 |
| JP | 2001-042215 A | 2/2001 |
| JP | 2004-199000 A | 7/2004 |
| JP | 2006-189627 A | 7/2006 |
| JP | 2006-235062 A | 9/2006 |
| JP | 2006-308649 A | 11/2006 |

* cited by examiner

*Primary Examiner*—Evelyn A. Lester
(74) *Attorney, Agent, or Firm*—Canon USA Inc IP Div

(57) ABSTRACT

A zoom lens system includes, in order from an object side to an image side, a first lens unit having a positive optical power, a second lens unit having a negative optical power, a third lens unit having a positive optical power, and a fourth lens unit having a positive optical power. The distances between the adjacent lens units are changed during zooming. By appropriately setting the lens configurations and focal lengths of the first lens unit and the second lens unit, a compact zoom lens system is realized.

13 Claims, 17 Drawing Sheets

FIG. 1A WIDE ANGLE END
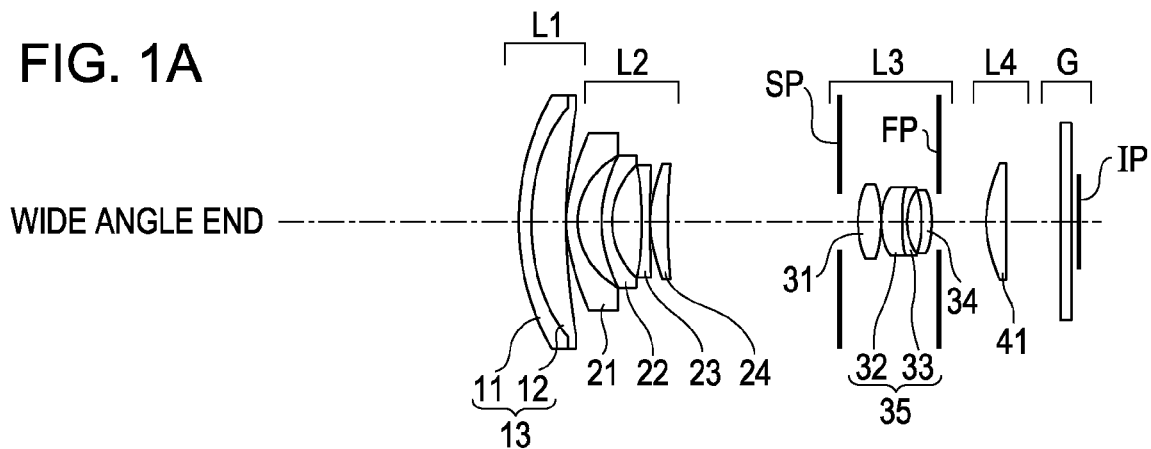
FIG. 1B INTERMEDIATE
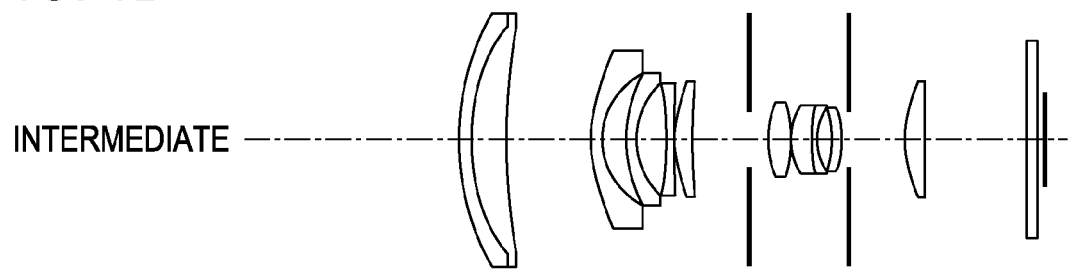
FIG. 1C TELEPHOTO END
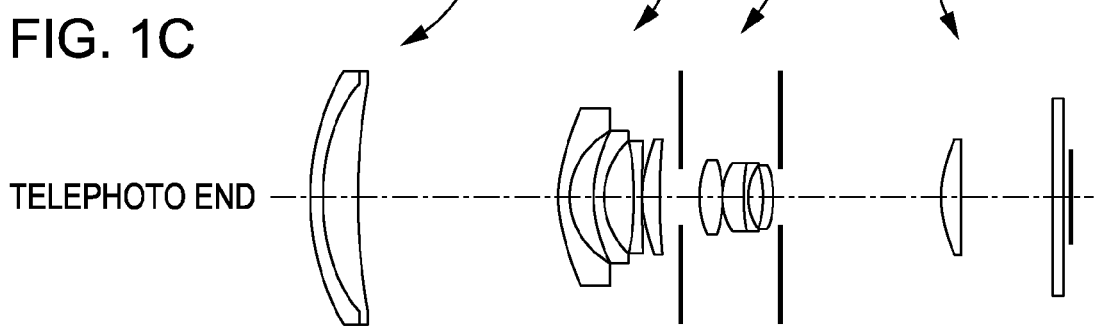

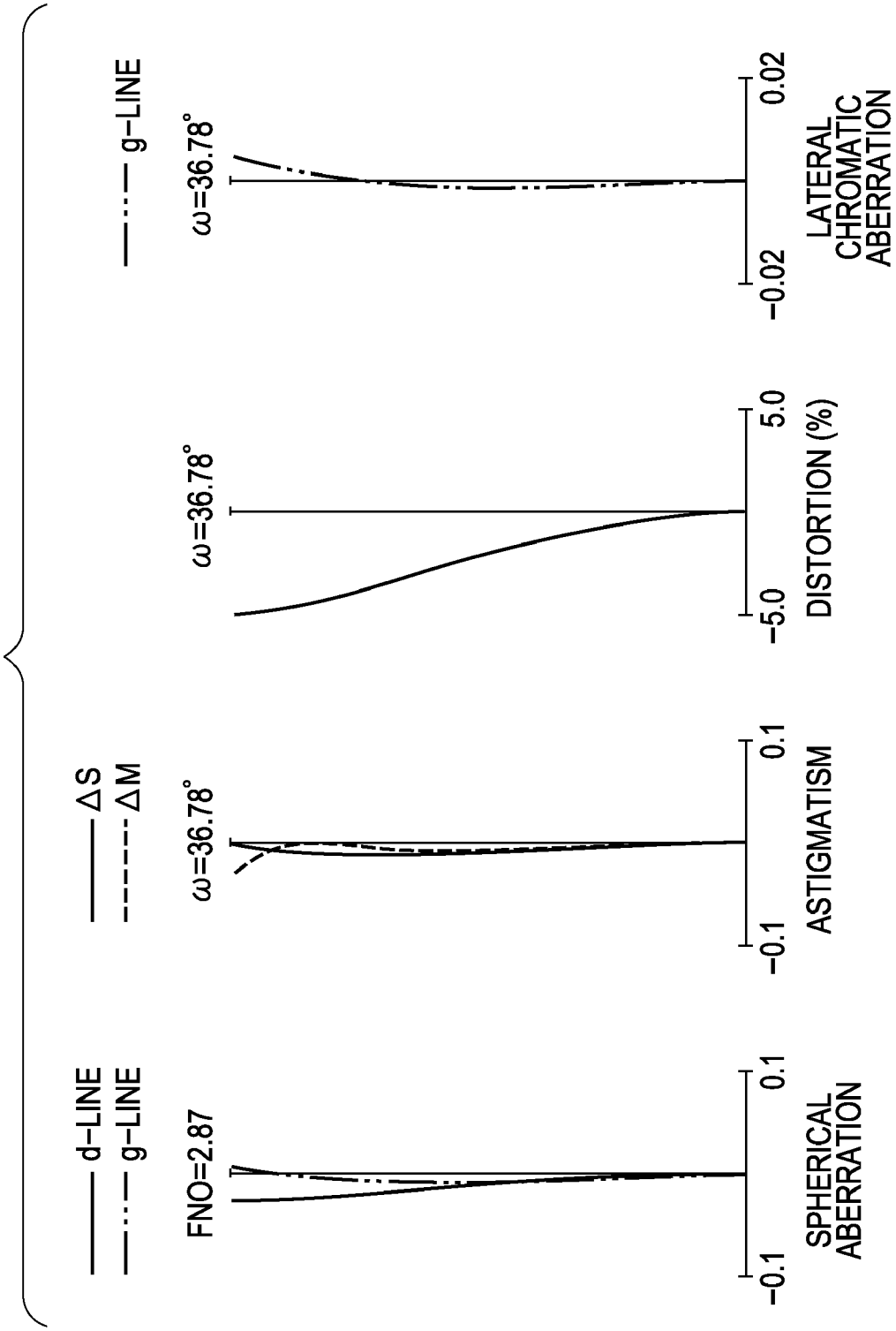

FIG. 5A WIDE ANGLE END
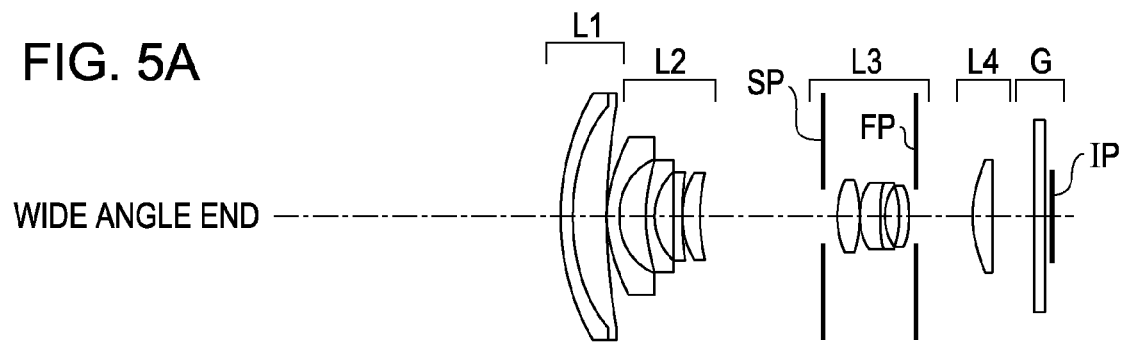
FIG. 5B INTERMEDIATE
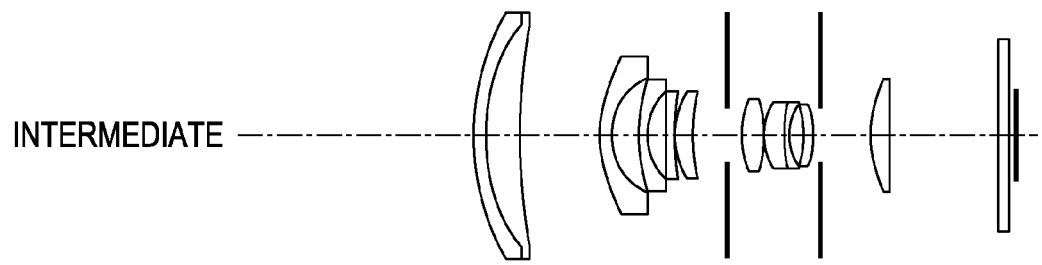
FIG. 5C TELEPHOTO END
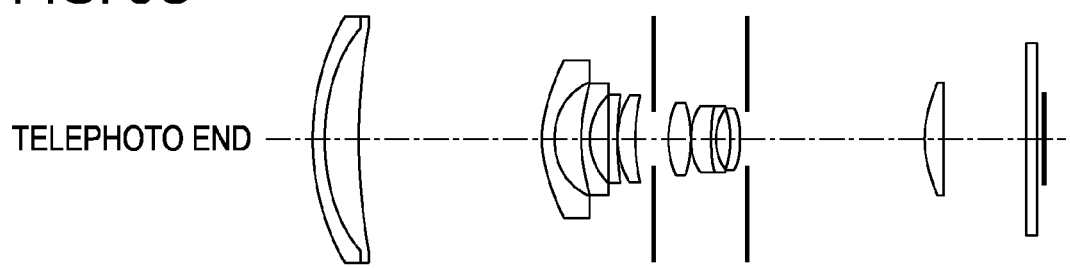

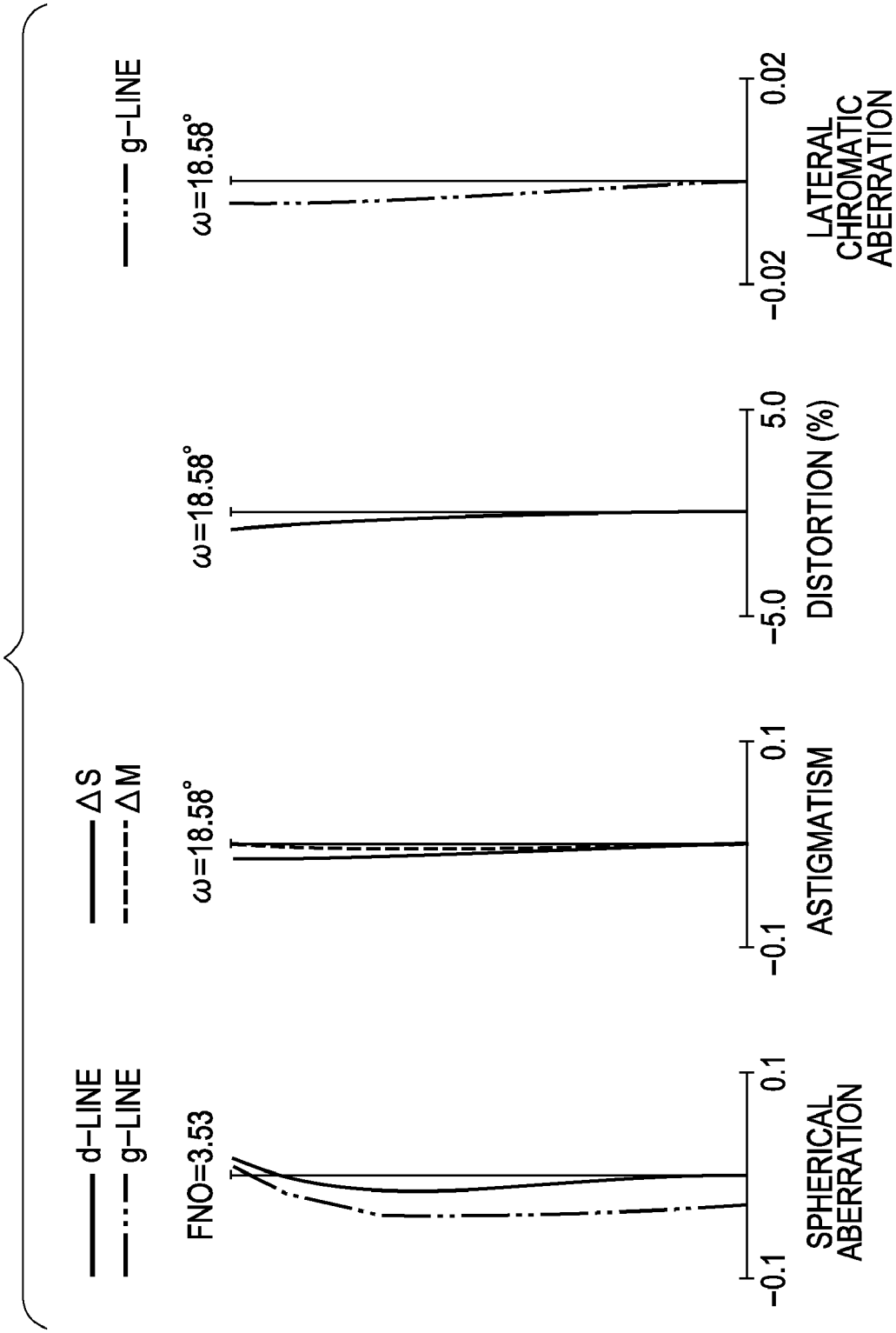

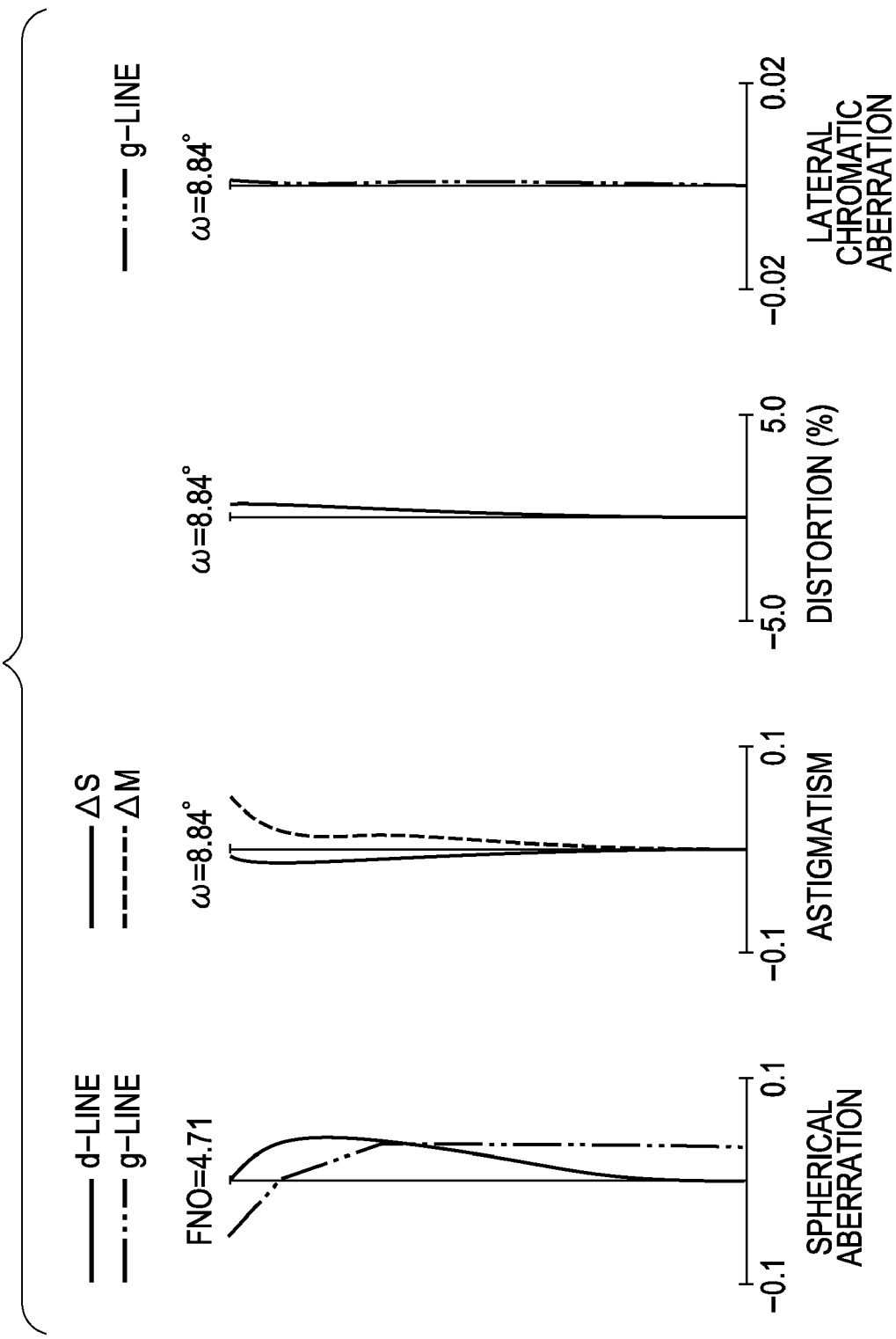

WIDE ANGLE END

INTERMEDIATE

TELEPHOTO END

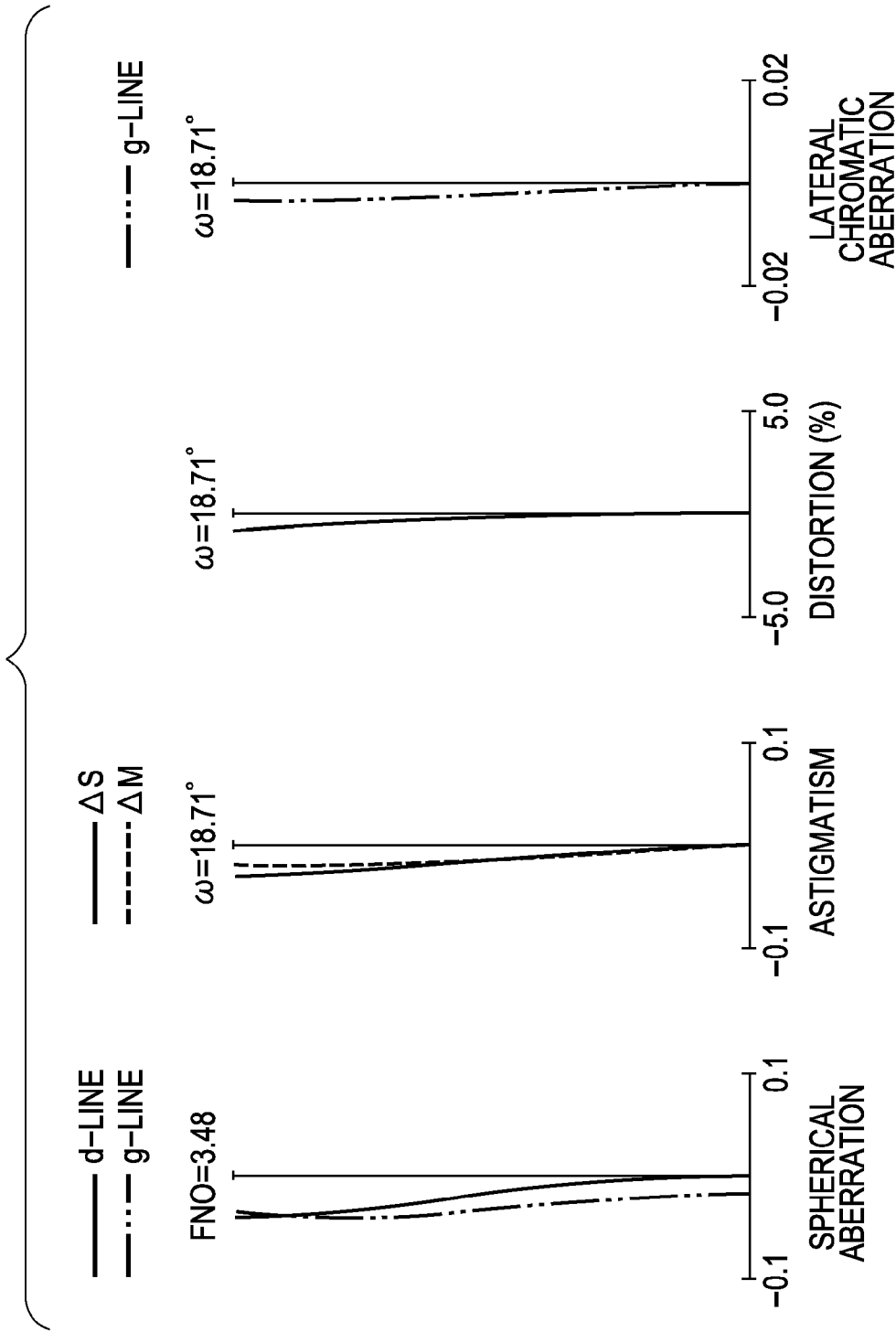

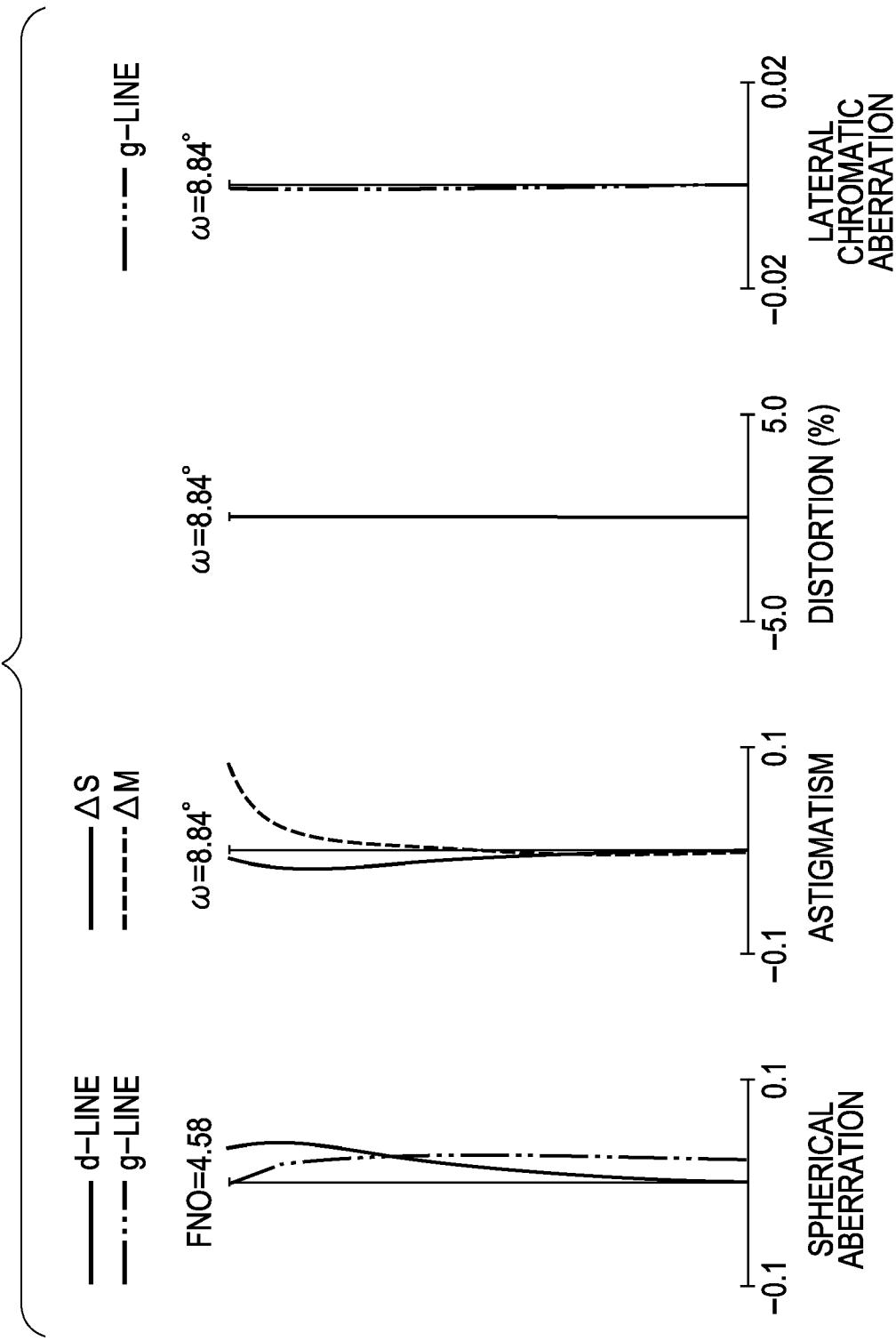

WIDE ANGLE END

INTERMEDIATE

TELEPHOTO END

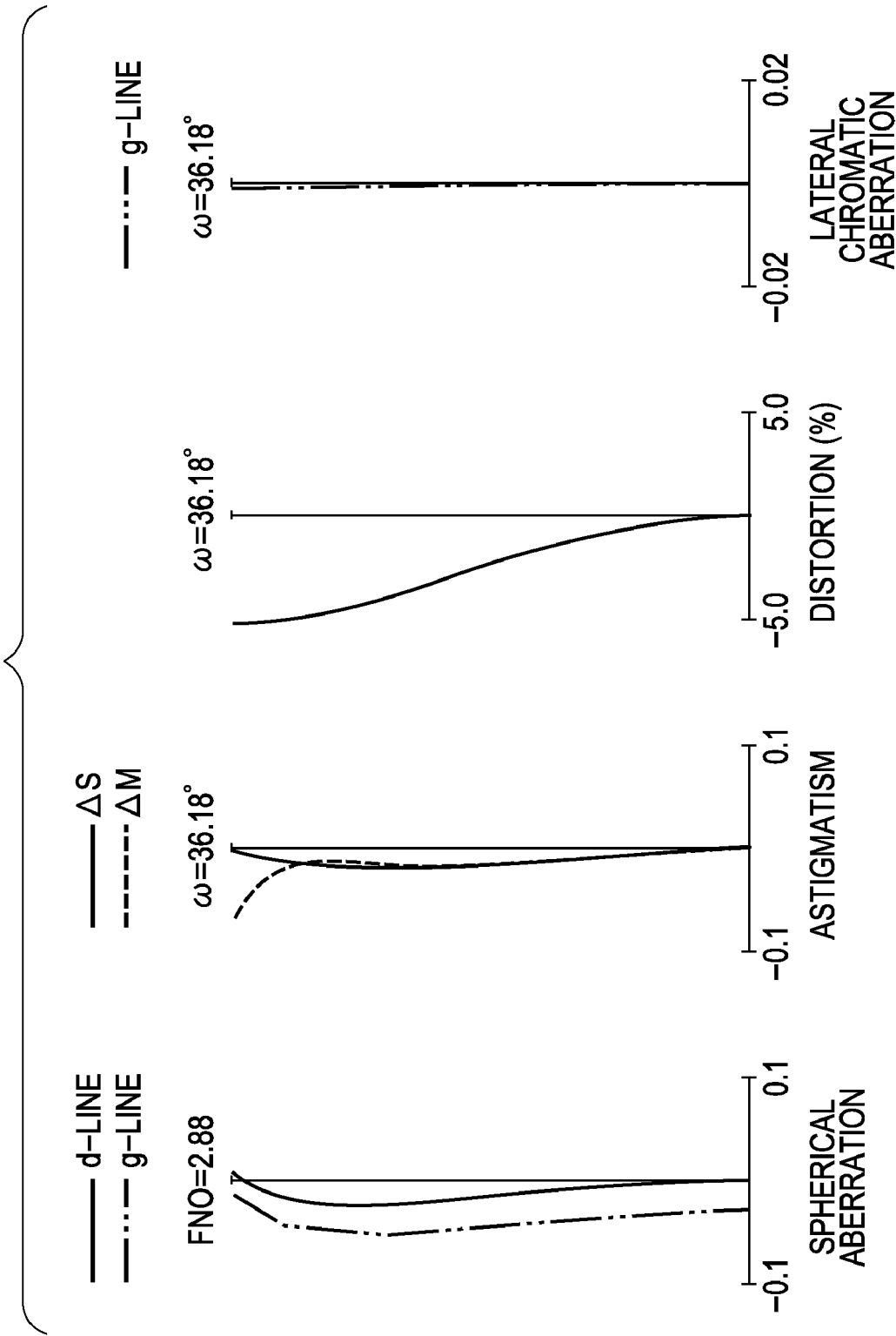

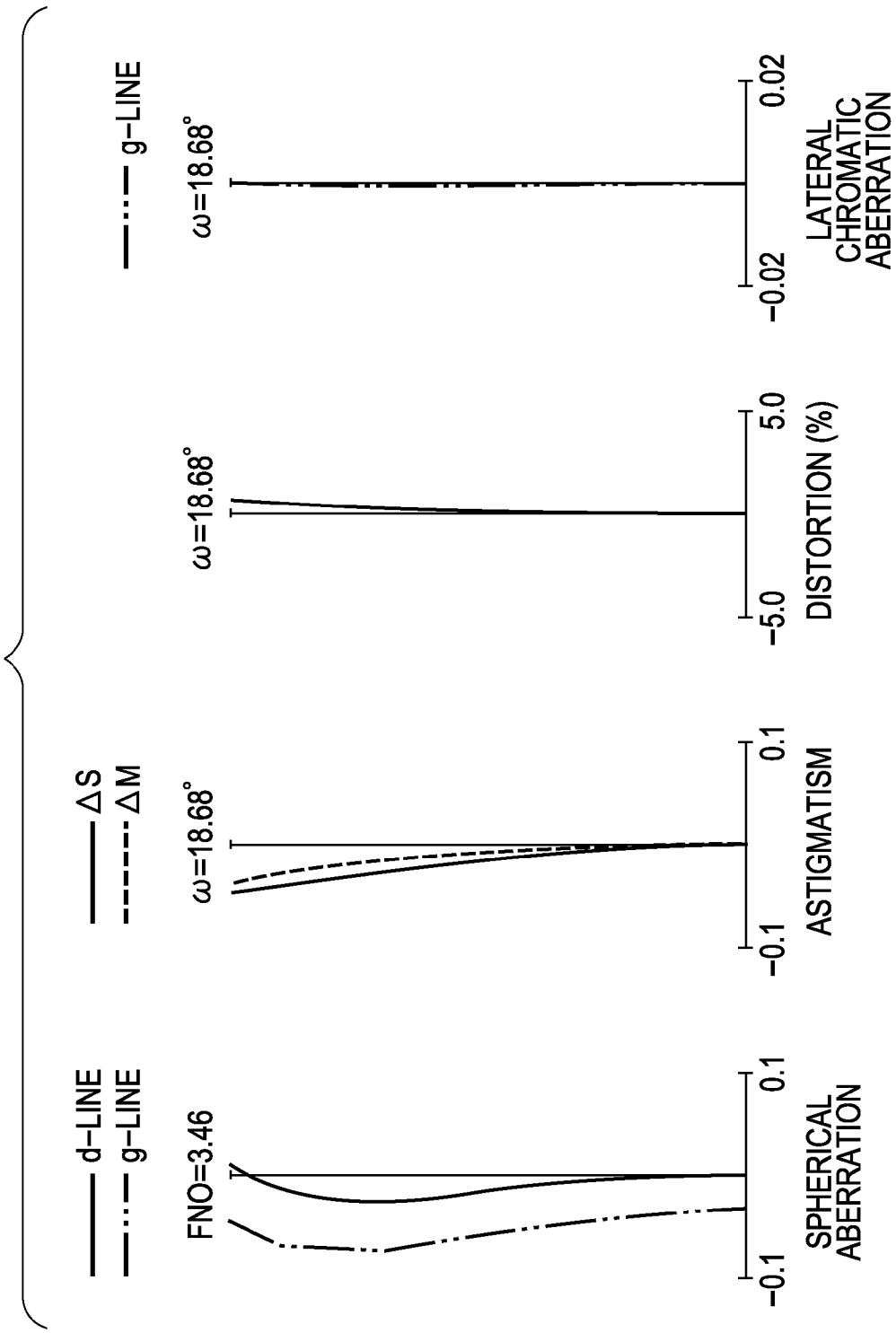

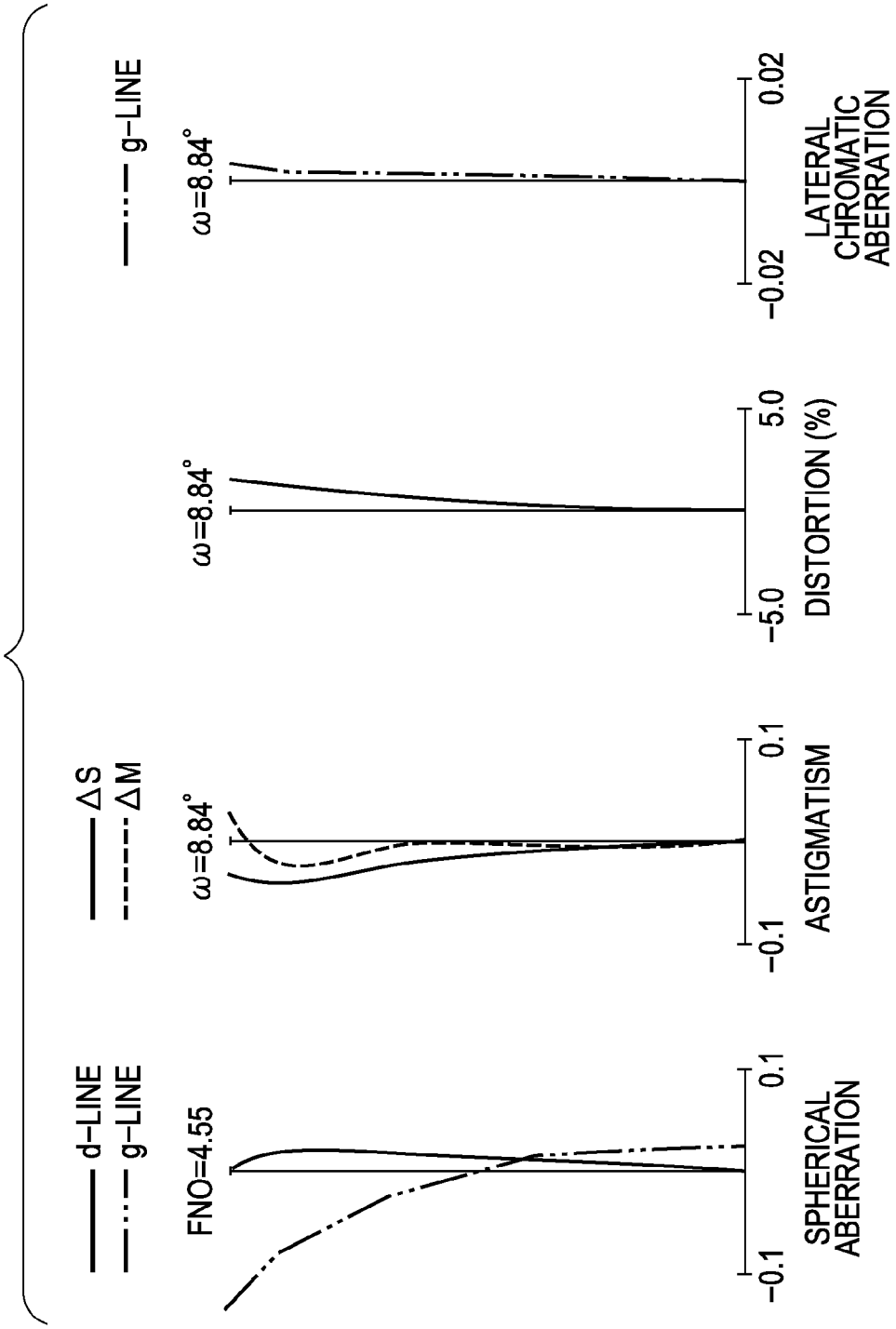

ZOOM LENS SYSTEM AND CAMERA INCLUDING THE SAME

BACKGROUND OF THE INVENTION

1. Field of the Invention

The present invention relates to a zoom lens system for suitable use in an image pickup apparatus using a solid-state image pickup element, such as a video camera, an electronic still camera, a broadcast camera, or a surveillance camera, or an image pickup apparatus such as a camera using a silver film, and to a camera including the zoom lens system.

2. Description of the Related Art

In recent years, image pickup apparatuses, such as a video camera, a digital still camera, a broadcast camera, and a surveillance camera using a solid-state image pickup element, and a camera using a silver film, have been sophisticated and reduced in total size.

As an image taking optical system for use in the image pickup apparatuses, there is a demand for a zoom lens system having a long total length, a compact size, a high zoom ratio, and a high resolving power.

A positive lead type zoom lens system is known as a zoom lens system that meets this demand. In a positive lead type zoom lens system, a lens unit having a positive refractive power is provided on an object side.

As a positive lead type zoom lens system, a four-unit zoom lens system is known which includes, in order from the object side to the image side, a first lens unit having a positive refractive power, a second lens unit having a negative refractive power, a third lens unit having a positive refractive power, and a fourth lens unit having a positive refractive power.

Japanese Patent Laid-Open Nos. 2001-042215 (US counterpart: U.S. Pat. No. 6,633,437) and 2004-199000 disclose four-unit zoom lens systems having a simple structure in which a first lens unit is formed by one lens element.

Japanese Patent Laid-Open No. 2006-235062 (US counterpart: U.S. Pat. No. 7,167,320) also discloses a four-unit zoom lens system having a simple structure in which a first lens unit is composed of one negative lens element and one positive lens element.

Japanese Patent Laid-Open Nos. 2006-308649 (US counterpart: U.S. Pat. No. 7,333,274) and 2000-347102 (US counterpart: U.S. Pat. No. 6,867,925) also disclose four-unit zoom lens systems in which a first lens unit is formed by a cemented lens of a negative lens element and a positive lens element, and a second lens unit includes three negative lens elements and one positive lens element.

Japanese Patent Laid-Open No. 2006-189627 (US counterpart: US Patent Application Publication No. 2006/0146417 A1) discloses a four-unit zoom lens system in which a third lens unit is moved in a direction having a component perpendicular (orthogonal) to the optical axis in order to correct image blur caused by vibration of the zoom lens system.

In general, in order to reduce the total size of the zoom lens system while maintaining a predetermined zoom ratio, the number of lens elements is reduced while increasing the refractive powers of the lens units in the zoom lens system.

In this case, however, when the thicknesses of the lens elements increase with the increase in refractive power of the lens surfaces, it becomes more difficult to correct various aberrations.

In the above-described four-unit zoom lens systems, in order to obtain a high optical performance while ensuring a high zoom ratio and a reduced total size, it is important to appropriately set the refractive powers and lens configurations of the lens units and the moving conditions of the lens units during zooming.

In particular, it is important to appropriately set the moving conditions of the lens units during zooming and refractive powers and lens configurations of the first and second lens units.

If the above-described factors are not appropriately set, it is significantly difficult to obtain a high optical performance over the entire zoom range while ensuring a reduced diameter of the foremost lens and a high zoom ratio.

SUMMARY OF THE INVENTION

The present invention provides a compact zoom lens system that achieves a high zoom ratio, a small diameter of the foremost lens, and a high optical performance over the entire zoom range.

A zoom lens system according to an aspect of the present invention includes, in order from an object side to an image side, a first lens unit having a positive optical power, a second lens unit having a negative optical power, a third lens unit having a positive optical power, and a fourth lens unit having a positive optical power. Zooming is performed by changing the distances between the adjacent lens units so that a distance between the first lens unit and the second lens unit is longer at a telephoto end than at a wide angle end, so that a distance between the second lens unit and the third lens unit is shorter at the telephoto end than at the wide angle end, and so that a distance between the third lens unit and the fourth lens unit is different at the wide angle end and at the telephoto end.

In this zoom lens system, the lens configurations and focal lengths of the first lens unit and the second lens unit are set appropriately.

Further features of the present invention will become apparent from the following description of exemplary embodiments with reference to the attached drawings.

BRIEF DESCRIPTION OF THE DRAWINGS

FIGS. 1A, 1B, and 1C are cross-sectional views of a zoom lens system according to a first embodiment of the present invention.

FIG. 2 includes aberration diagrams at a wide angle end in the first embodiment.

FIGS. 5A, 5B, and 5C are cross-sectional views of a zoom lens system according to a second embodiment of the present invention.

FIG. 7 includes aberration diagrams at an intermediate zoom position in the second embodiment.

FIG. 8 includes aberration diagrams at a telephoto end in the second embodiment.

FIG. 11 includes aberration diagrams at an intermediate zoom position in the third embodiment.

FIG. 12 includes aberration diagrams at a telephoto end in the third embodiment.

FIG. 14 includes aberration diagrams at a wide angle end in the fourth embodiment.

FIG. 15 includes aberration diagrams at an intermediate zoom position in the fourth embodiment.

FIG. 16 includes aberration diagrams at a telephoto end in the fourth embodiment.

DESCRIPTION OF THE EMBODIMENTS

A zoom lens system and a camera according to an embodiment of the present invention will be described below.

A zoom lens system according to an embodiment of the present invention includes, in order from the object side to the image side, a first lens unit having a positive refractive power (optical power=the reciprocal of the focal length), a second lens unit having a negative refractive power, a third lens unit having a positive refractive power, and a fourth lens unit having a positive refractive power. During zooming, the distances between the adjacent lens units (the distance between the first and second lens units, the distance between the second and third lens units, and the distance between the third and fourth lens units) are changed.

Figure 3:
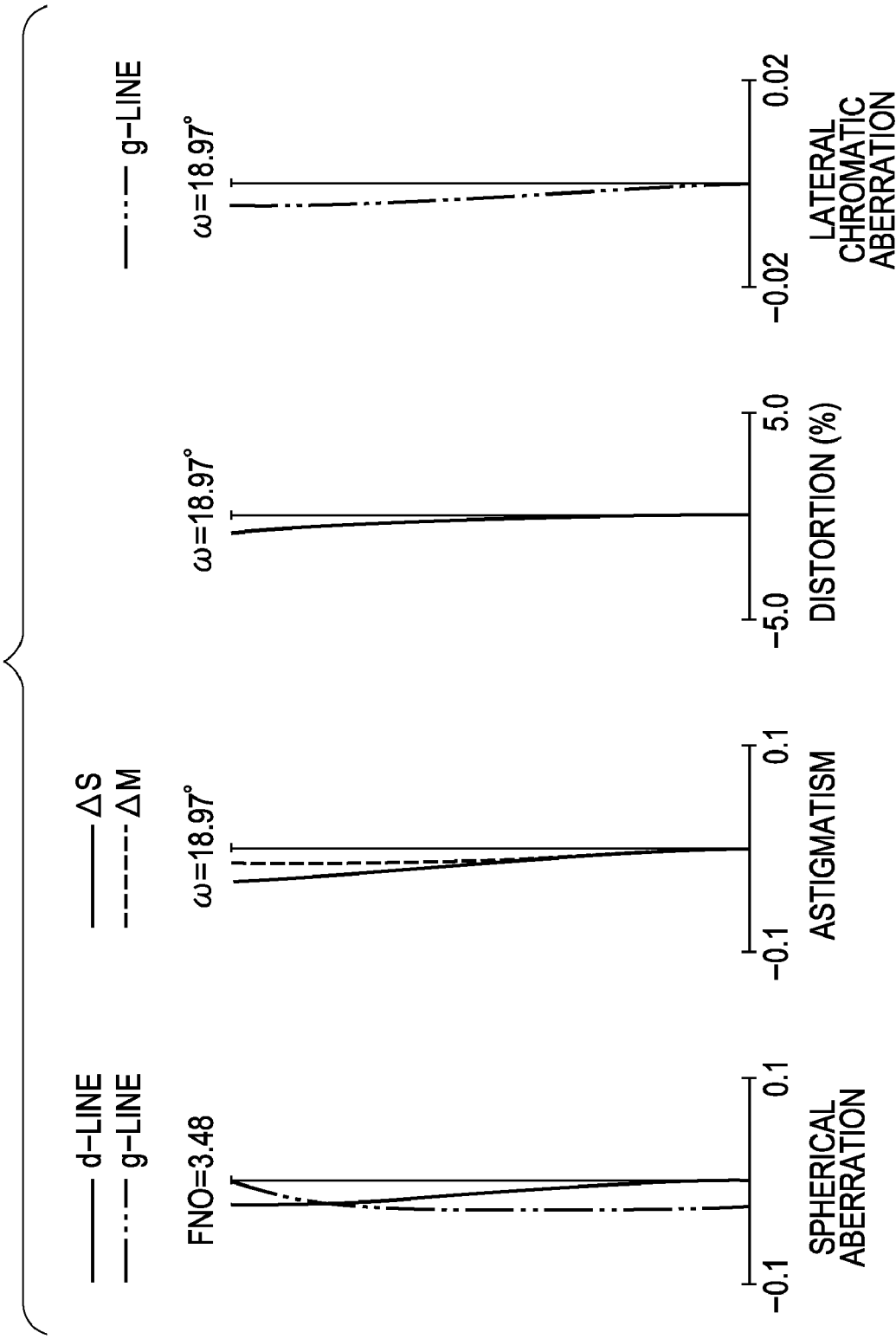
FIG. 3 includes aberration diagrams at an intermediate zoom position in the first embodiment.
Figure 4:
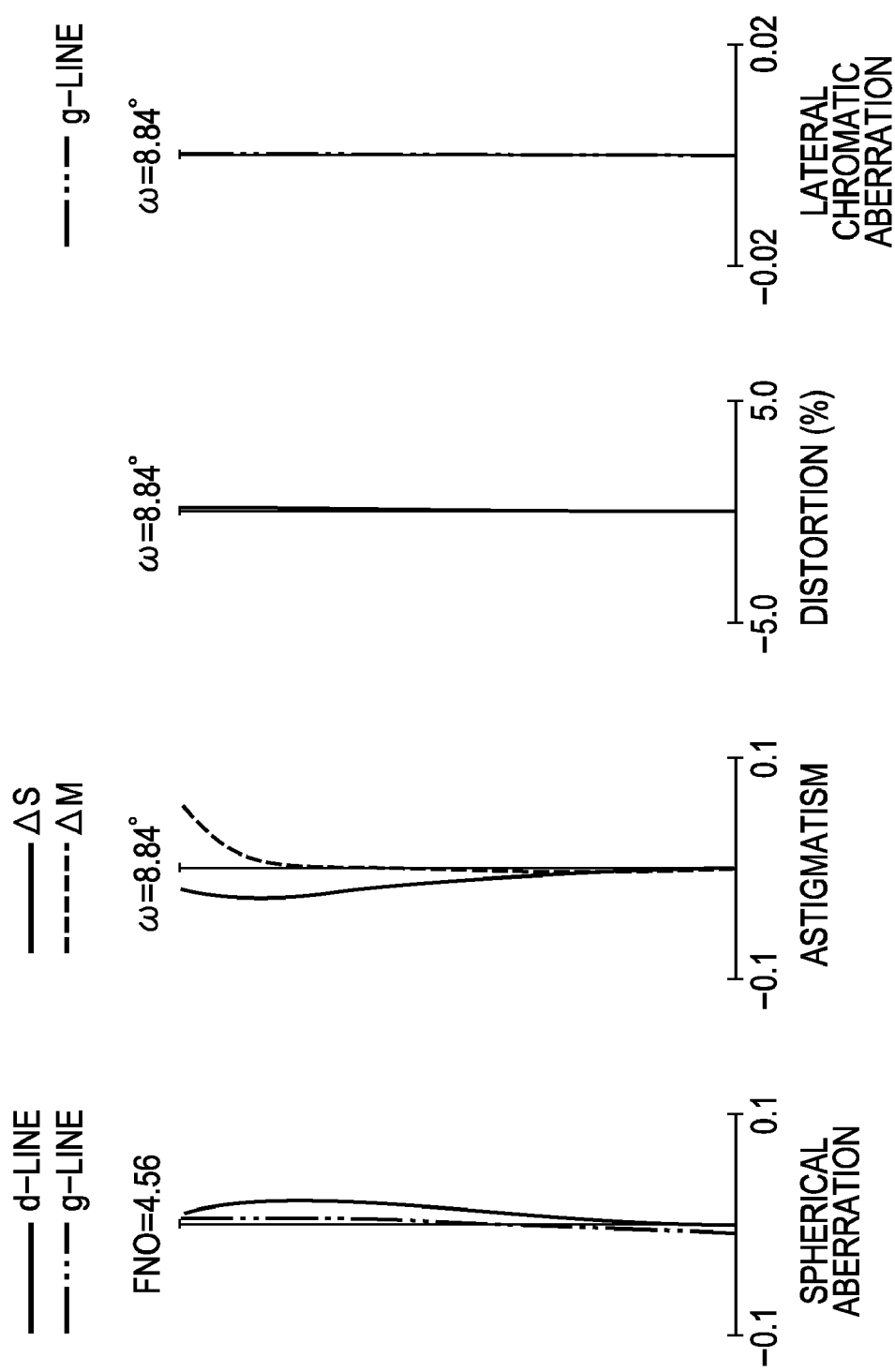
FIG. 4 includes aberration diagrams at a telephoto end in the first embodiment.

FIGS. 1A, 1B, and 1C are cross-sectional views of a zoom lens system according to a first embodiment of the present invention. FIGS. 2, 3, and 4 are aberration diagrams, respectively, at a wide angle end (short focal-length end), an intermediate zoom position, and a telephoto end (long focal-length end) in the zoom lens system of the first embodiment.

Figure 6:
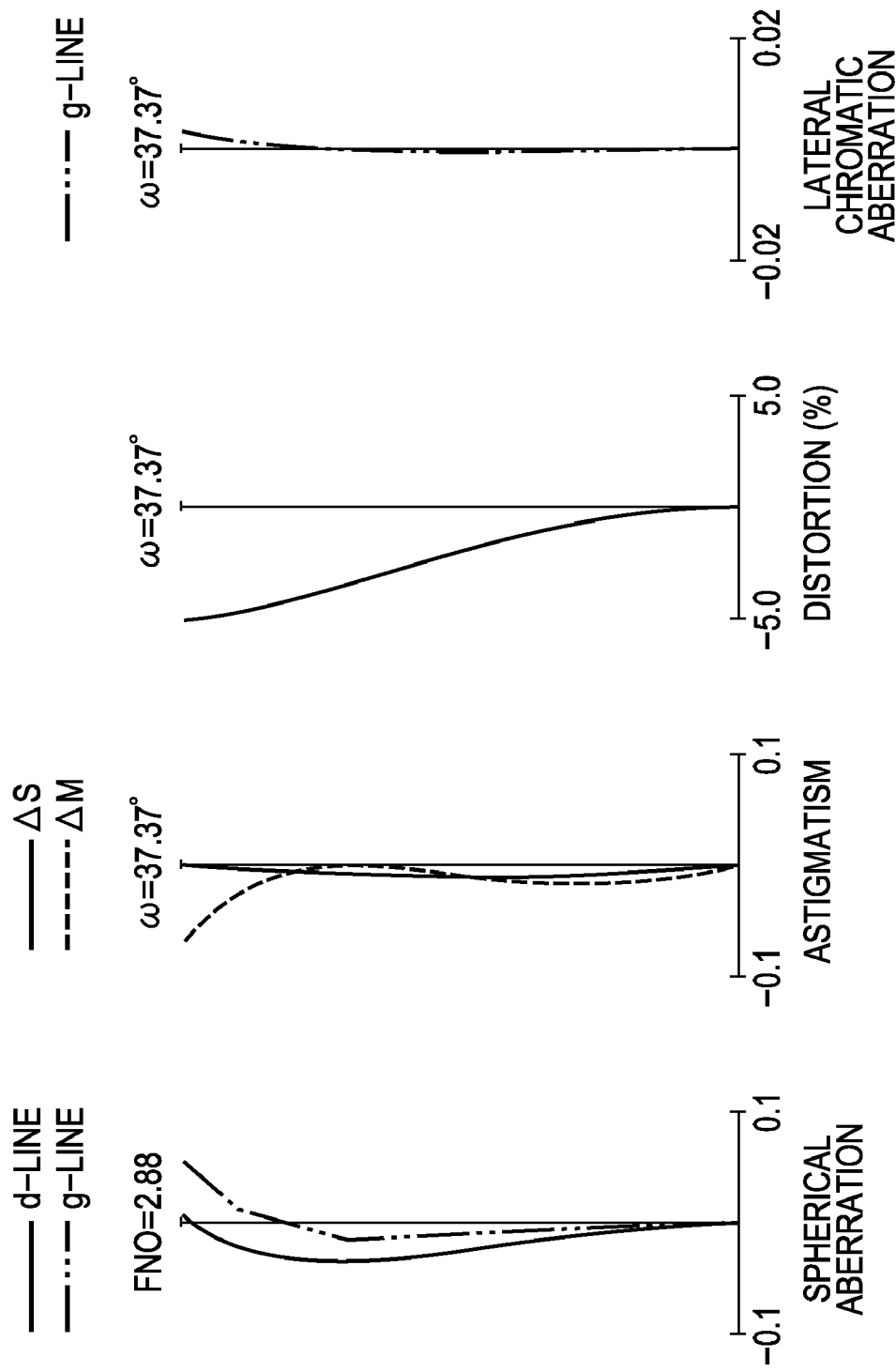
FIG. 6 includes aberration diagrams at a wide angle end in the second embodiment.

FIGS. 5A, 5B, and 5C are cross-sectional views of a zoom lens system according to a second embodiment of the present invention. FIGS. 6, 7, and 8 are aberration diagrams, respectively, at a wide angle end, an intermediate zoom position, and a telephoto end in the zoom lens system of the second embodiment.

Figure 9A:
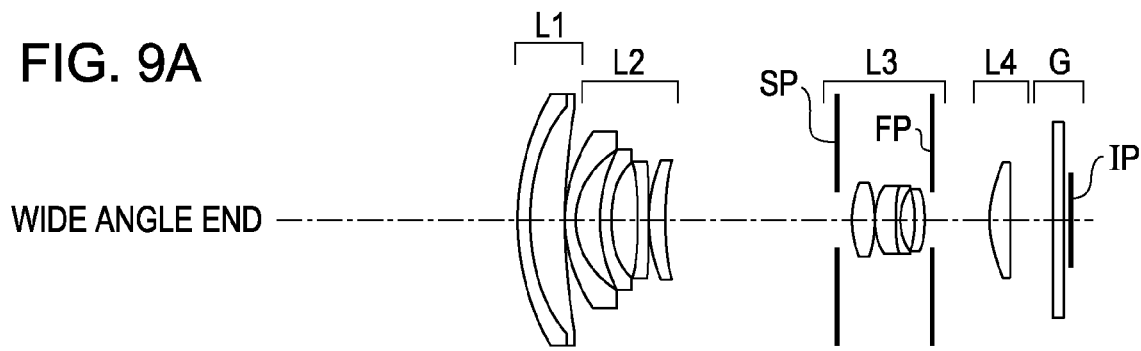
FIGS. 9A, 9B, and 9C are cross-sectional views of a zoom lens system according to a third embodiment of the present invention.
Figure 9B:
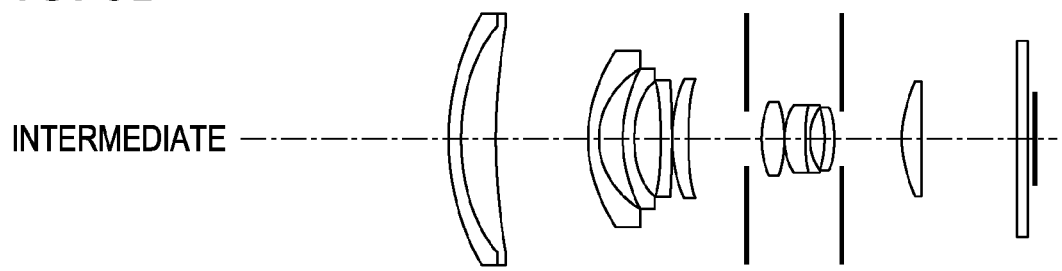
Figure 9C:
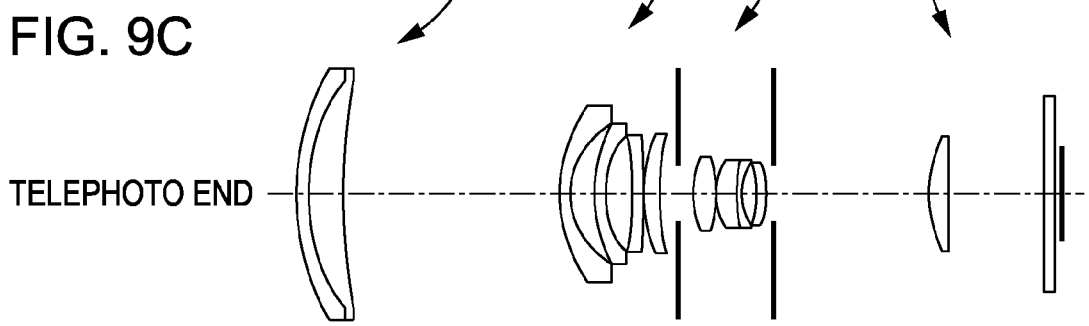
Figure 10:
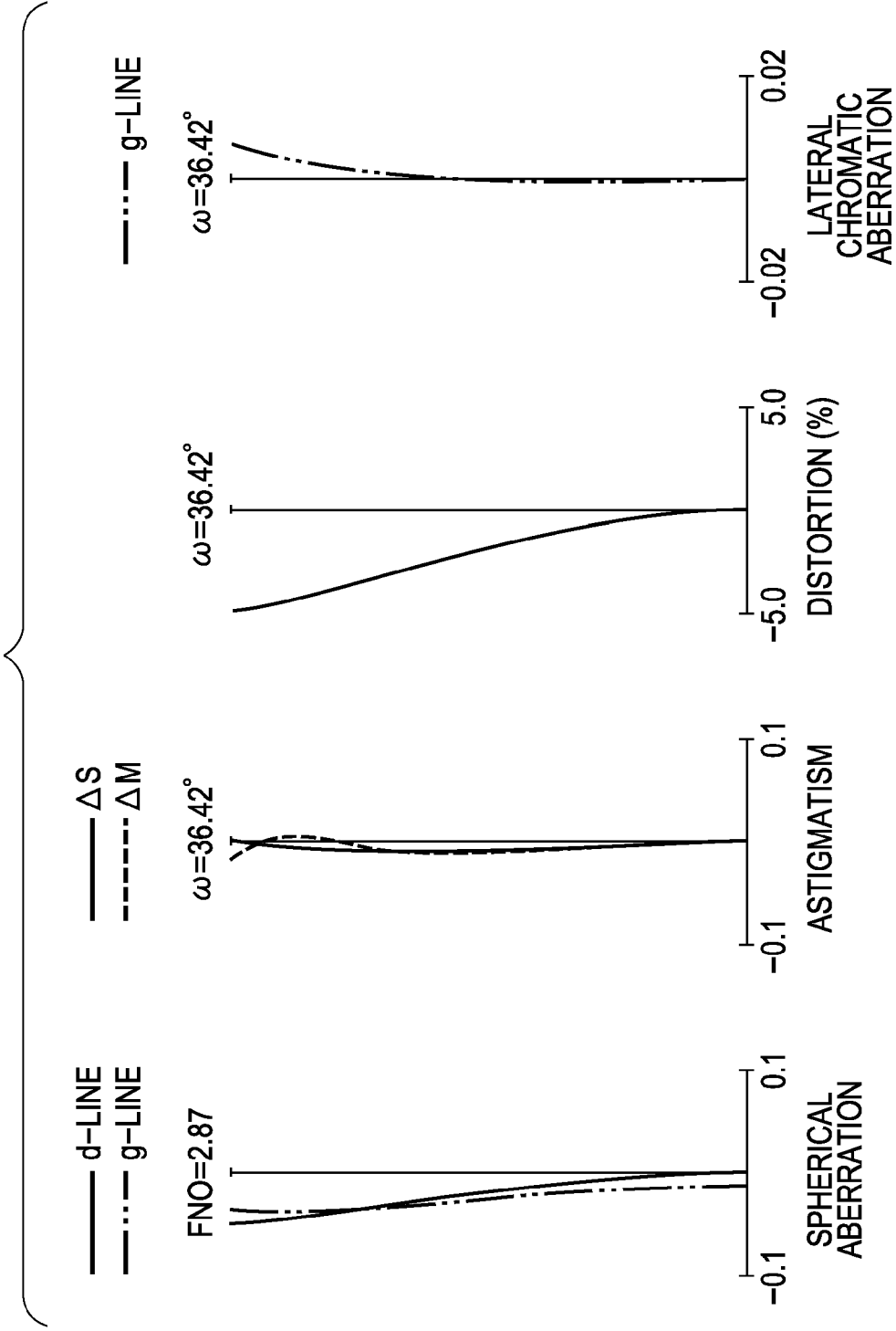
FIG. 10 includes aberration diagrams at a wide angle end in the third embodiment.

FIGS. 9A, 9B, and 9C are cross-sectional views of a zoom lens system according to a third embodiment of the present invention. FIGS. 10, 11, and 12 are aberration diagrams, respectively, at a wide angle end, an intermediate zoom position, and a telephoto end in the zoom lens system of the third embodiment.

Figure 13A:
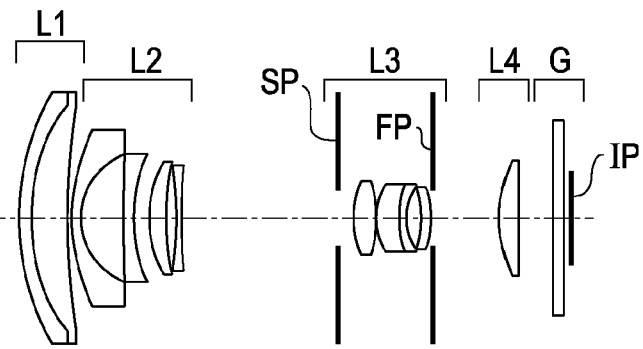
FIGS. 13A, 13B, and 13C are cross-sectional views of a zoom lens system according to a fourth embodiment of the present invention.
Figure 13B:
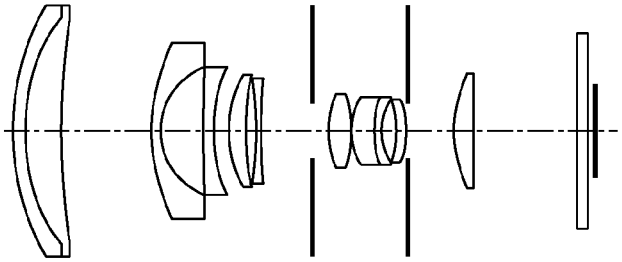
Figure 13C:
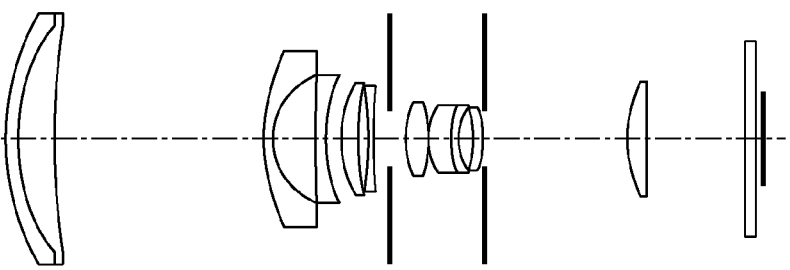

FIGS. 13A, 13B, and 13C are cross-sectional views of a zoom lens system according to a fourth embodiment of the present invention. FIGS. 14, 15, and 16 are aberration diagrams, respectively, at a wide angle end, an intermediate zoom position, and a telephoto end in the zoom lens system of the fourth embodiment.

Figure 17:
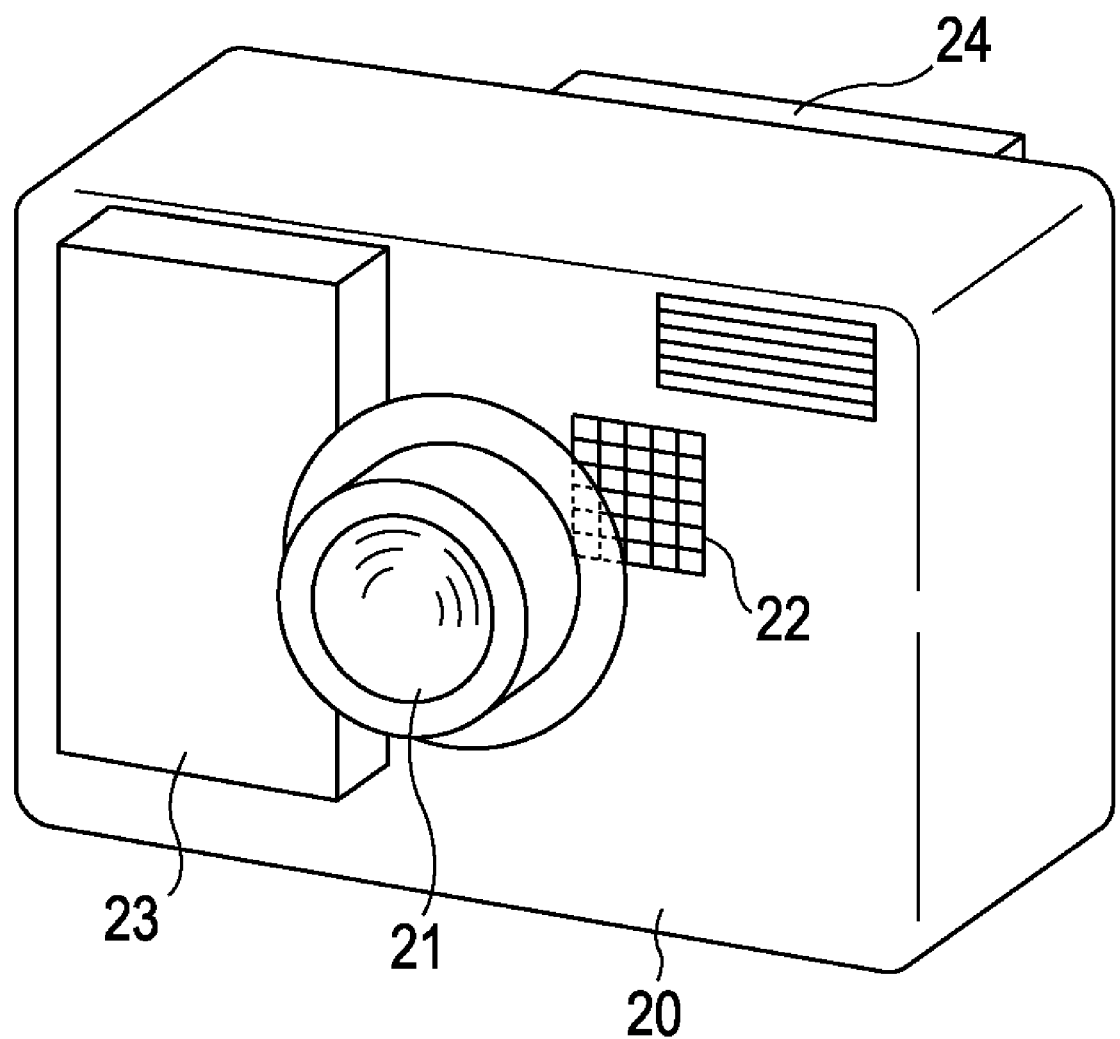
FIG. 17 is a schematic view of the principal part of a camera according to an embodiment of the present invention.

FIG. 17 is a schematic view showing the principal part of a camera including the zoom lens system of any of the embodiments of the present invention. In the embodiments, the zoom lens system is an image-taking lens system for use in an image pickup apparatus such as a video camera, a digital camera, or a silver film camera.

In the cross-sectional views of the zoom lens systems, A, B, and C show the wide angle end, the intermediate zoom position, and the telephoto end, respectively.

In the cross-sectional views of the zoom lens systems, the left side is the object side (front side), and the right side is the image side (rear side).

In the cross-sectional views of the zoom lens systems, L1 represents a first lens unit having a positive refractive power, L2 represents a second lens unit having a negative refractive power, L3 represents a third lens unit having a positive refractive power, and L4 represents a fourth lens unit having a positive refractive power.

SP represents an aperture stop that is provided on the object side of the third lens unit L3.

FP represents a flare-cut stop that is provided on the image side of the third lens unit L3.

G represents an optical block corresponding to an optical filter, a face plate, a crystal low-pass filer, or an infrared cut filter.

IP represents an image plane. When the zoom lens system of the embodiment is used as an image-taking optical system in a video camera or a digital still camera, the image plane IP corresponds to an image pickup plane of a solid-state image pickup element (photoelectric conversion element) such as a CCD sensor or a CMOS sensor. When the zoom lens system of the embodiment is used as an image-taking optical system in a silver film camera, the image plane IP corresponds to a film surface.

In the aberration diagrams, d and g respectively represent the d-line and the g-line. ΔM and ΔS respectively represent a meridional image plane and a sagittal image plane. Lateral chromatic aberration is shown by the g-line, ω represents the half field angle, and FNO represents the f-number.

In the following embodiments, the wide angle end and the telephoto end refer to zoom positions where the lens unit for zooming is placed at both ends of a mechanically movable range on the optical axis.

In the embodiments, the lens units are moved during zooming from the wide angle end to the telephoto end, as shown by the arrows.

More specifically, during zooming from the wide angle end to the telephoto end, the first lens unit L1 is moved to the image side, and is then moved to the object side. In other words, the first lens unit L1 moves while forming a locus convex toward the image side. Further, the second lens unit L2 is moved to the image side, and is then moved to the object side. In other words, the second lens unit L2 moves while forming a locus convex toward the image side.

During zooming from the wide angle end to the telephoto end, the third lens unit L3 is moved to the object side. The fourth lens unit L4 moves while forming a locus convex toward the object side so as to compensate for an image plane variation due to zooming.

The zoom lens system adopts a rear focus method in which focusing is performed by moving the fourth lens unit L4 along the optical axis.

For focusing from an object at infinity to a near object at the telephoto end, the fourth lens unit L4 shown in the lens cross-sectional views is moved toward the object side (front side).

In the embodiments, the aperture stop SP and the flare-cut stop FP move together with the third lens unit L3 during zooming. When the aperture stop SP moves together with the third lens unit L3, the number of moving units is less than when the aperture stop SP moves separately from the third lens unit L3. This can easily simplify the mechanical structure.

In the embodiments, the first lens unit L1 consists of one positive lens element and one negative lens element. The second lens unit L2 consists of three negative lens elements and one positive lens element.

Further, the following conditions are satisfied:

$$8.0 < f1/fw < 13.0 \quad (1)$$

$$1.0 < |f2|/fw < 1.7 \quad (2)$$

where fw represents the focal length of the entire zoom lens system at the wide angle end, f1 represents the focal length of the first lens unit L1, and f2 represents the focal length of the second lens unit L2.

Conditional Expression (1) specifies the focal length, that is, the refractive power of the first lens unit L1. When the value is more than the upper limit and the refractive power is too weak, the layout of refractive power in the positive lead type is disturbed, and the moving strokes (moving amounts) of the first lens unit L1 and the third lens unit L3 are increased to obtain a high zoom ratio.

As a result, the total length of the zoom lens system increases at the telephoto end. When the value is less than the lower limit and the refractive power is too strong, much spherical aberration occurs at the telephoto end while the first lens unit L1 is composed of two lens elements. When the number of lens elements in the first lens unit L1 is increased to correct the aberration in this case, the diameter of the foremost lens increases undesirably.

Conditional Expression (2) specifies the focal length, that is, the refractive power of the second lens unit L2. In a case in which the value is more than the upper limit value and the refractive power is too weak, when the image-taking viewing angle is increased at the wide angle end, the diameter of the foremost lens increases.

In order to obtain both a wide viewing angle and a smaller diameter of the foremost lens, it is necessary to increase the refractive power of the second lens unit L2 to an extent such that the value does not exceed the upper limit. When the value is less than the lower limit and the refractive power is too strong, undesirably, much curvature of field occurs at the wide angle end, and much spherical aberration occurs at the telephoto end.

It is more preferable to set the numerical values in Conditional Expressions (1) and (2) within the following ranges:

$$8.5 < f1/fw < 12.0 \tag{1a}$$

$$1.1 < |f2|/fw < 1.6 \tag{2a}$$

By thus specifying the structures, as described above, the positive lead type zoom lens systems of the embodiments of the present invention can be properly corrected for aberrations over the entire zoom range, and can be made compact with a small diameter of the foremost lens while maintaining a wide angle view and a high zoom ratio.

While the zoom lens system that meets the original purpose of the present invention is realized by satisfying the above-described conditions, it is more preferable to satisfy the following condition:

$$2.0 < m1/fw < 5.0 \tag{3}$$

where m1 (absolute value) represents the distance (amount of displacement) between the position of the first lens unit L1 in the optical axis direction at the wide angle end and the position of the first lens element L1 in the optical axis direction at the telephoto end.

Conditional Expression (3) specifies the amount of displacement of the lens unit L1 due to zooming. When the value is more than the upper limit and the amount of displacement is too large, the total length of the zoom lens system undesirably increases at the telephoto end, and this increases the diameter of the foremost lens. Further, when the zoom lens system is formed by a retractable lens barrel, the number of slide sections increases, and the diameter of the lens barrel increases. In contrast, when the value is less than the lower limit and the amount of displacement is too small, the zooming effect obtained by changing the distance between the first lens unit L1 and the second lens unit L2 decreases. For this reason, there is a need to increase the refractive power of the second lens unit L2 or the third lens unit L3 in order to obtain a desired zoom ratio. However, this causes much curvature of field and spherical aberration.

It is more preferable to set the numerical values in Conditional Expression (3) in the following range:

$$2.5 < m1/fw < 4.5 \tag{3a}$$

Further, it is preferable to satisfy the following condition:

$$1.5 < f3/fw < 2.7 \tag{4}$$

where f3 represents the focal length of the third lens unit L3.

Conditional Expression (4) specifies the focal length, that is, the refractive power of the third lens unit L3. When the value is more than the upper limit and the refractive power is too weak, the zooming effect obtained by moving the third lens unit L3 decreases. Therefore, it is necessary to increase the amount of displacement of the first lens unit L1 or the third lens unit L3. As a result, the total length of the zoom lens system at the telephoto end undesirably increases. In contrast, when the value is less than the lower limit and the refractive power is too strong, much spherical aberration and coma aberration occur at the third lens unit L3.

It is more preferable to set the numerical value in Conditional Expression (4) within the following range:

$$1.7 < f3/fw < 2.5 \tag{4a}$$

Further, it is preferable to satisfy the following condition:

$$4.0 < f4/fw < 7.0 \tag{5}$$

where f4 represents the focal length of the fourth lens unit L4.

Conditional Expression (5) specifies the focal length, that is, the refractive power of the fourth lens unit L4. When the value is more than the upper limit and the refractive power is too weak, the effect of compensating for curvature of field due to zooming is lessened, and the amount of displacement amount for focusing. Consequently, quick focusing becomes difficult. In contrast, when the value is less than the lower limit and the refractive power is too strong, the Petzval sum increases, and curvature of field increases over the entire zoom range. If the number of lens elements in the fourth lens unit L4 is increased to prevent curvature of field, the weight of the fourth lens unit L4 increases. This increases the torque for driving the fourth lens unit L4.

It is more preferable to set the numerical value in Conditional Expression (5) within the following range:

$$5.0 < f4/fw < 6.5 \tag{5a}$$

It is preferable to satisfy the following condition:

$$0.2 < |\beta 2w|/(1/(ft/fw)^{-1/2}) < 0.6 \tag{6}$$

where β2w represents the lateral magnification of the second lens unit L2 at the wide angle end, and ft represents the focal length of the entire lens system at the telephoto end.

Conditional Expression (6) specifies the lateral magnification of the second lens unit L2 at the wide angle end. When the value is more than the upper limit and the absolute value of the lateral magnification is too large, it is difficult to increase the image-taking viewing angle at the wide angle end and to achieve a wide viewing angle. When the value is less than the lower limit and the absolute value of the lateral magnification is too small, much aberration occurs at the second lens unit L2. In particular, much curvature of field occurs at the wide angle side and much spherical aberration occurs at the telephoto side.

It is more preferable to set the numerical value in Conditional Expression (6) within the following range:

$$0.3 < |\beta 2w|/(1/(ft/fw)^{-1/2}) < 0.5 \quad (6a)$$

It is preferable to satisfy the following condition:

$$-3.0 < (R1a+R1b)/(R1a-R1b) < -1.0 \quad (7)$$

where R1$a$ and R1$b$ respectively represent the radii of curvature of a lens surface closest to the object side and a lens surface closest to the image side in the first lens unit L1.

Conditional Expression (7) specifies the shape factor of the cemented lens that forms the first lens unit L1. When the value in Conditional Expression (7) is less than −1, the cemented lens is shaped like a meniscus having a surface convex toward the object side. When the value is more than the upper limit and the cemented lens is not shaped like a meniscus having a surface convex toward the object side, the incident angle of off-axis rays increases at the wide angle end, and this causes much astigmatism. When the value is less than the lower limit and the meniscus degree excessively increases, much spherical aberration occurs at the telephoto end.

It is more preferable to set the numerical value in Conditional Expression (7) within the following range:

$$-2.8 < (R1a+R1b)/(R1a-R1b) < -1.2 \quad (7a)$$

It is preferable to satisfy the following condition:

$$-1.6 < (R4a+R4b)/(R4a-R4b) < -1.0 \quad (8)$$

where R4$a$ and R4$b$ respectively represent the radii of curvature of a lens surface closest to the object side and a lens surface closest to the image side in the fourth lens unit L4.

Conditional Expression (8) specifies the shape factor of the positive lens element that forms the fourth lens unit L4. When the value in Conditional Expression (8) is less than −1, the positive lens element is shaped like a meniscus having a surface convex toward the object side. When the value is more than the upper limit and the positive lens element is not shaped like a meniscus having a surface convex toward the object side, the effect of canceling the change in curvature of field caused in the first lens unit L1 by the change in object distance is lessened. Consequently, it becomes difficult to obtain a good image characteristic from the object at infinity to the near object. When the value is less than the lower limit and the meniscus degree excessively increases, the incident angle of off-axis rays increases, and this causes much astigmatism and lateral chromatic aberration.

It is more preferable to set the numerical value in Conditional Expression (8) within the following range:

$$-1.50 < (R4a+R4b)/(R4a-R4b) < -1.02 \quad (8a)$$

It is preferable to satisfy the following conditions:

$$1.9 < N2p \quad (9)$$

$$15 < v2p < 20 \quad (10)$$

where N2$p$ and v2$p$ respectively represent the refractive index and the Abbe number of the material that forms the positive lens element in the second unit L2.

Conditional Expression (9) specifies the refractive index of the positive lens element in the second lens unit L2. When the value is less than the lower limit and the refractive index is too low, the thickness of the positive lens element cannot be reduced, but the thickness of the second lens unit L2 increases. As a result, the diameter of the foremost lens increases.

Conditional Expression (10) specifies the Abbe number, that is, the dispersive power of the material that forms the positive lens element in the second lens unit L2. When the value is more than the upper limit and the dispersive power is too small, the effect of correcting chromatic aberration is lessened, and it is necessary to increase the refractive power of the positive lens element. As a result, much spherical aberration occurs at the telephoto side.

When the value is less than the lower limit value and the dispersive power is too large, this is advantageous in terms of correction of chromatic aberration. However, in the case of the typical glass material, the partial dispersion ratio increases, and a lot of secondary spectra occur at the telephoto side.

It is more preferable to set the numerical values in Conditional Expressions (9) and (10) within the following ranges:

$$1.9 < N2p < 2.2 \quad (9a)$$

$$16 < v2p < 19 \quad (10a)$$

It is more preferable to set the numerical value in Conditional Expression (9a) within the following range:

$$1.91 < N2p < 2.10 \quad (9b)$$

It is preferable that the third lens unit L3 have a negative lens element that satisfies the following conditions:

$$1.9 < N3n \quad (11)$$

$$15 < v3n < 30 \quad (12)$$

where N3$n$ represents the refractive index of the material of the negative lens element, and v3$n$ represents the Abbe number of the material of the negative lens element.

Conditional Expression (11) specifies the refractive index of the material that forms the negative lens element in the third lens unit L3. When the value is less than the lower limit and the refractive index is too low, the curvature of the surface of the negative lens element increases. As a result, much coma aberration occurs. When motion blur is corrected (image stabilization is performed) by moving the third lens unit L3 in a direction having a component perpendicular to the optical axis, tilting of the image plane often occurs.

Conditional Expression (12) specifies the Abbe number, that is, the dispersive power of the material of the negative lens element in the third lens unit L3. When the value is more than the upper limit and the dispersive power is too small, the effect of correcting chromatic aberration is lessened, and it is necessary to increase the refractive power of the negative lens element. As a result, much spherical aberration and coma aberration occur over the entire zoom range. When the value is less than the lower limit and the dispersive power is too large, this is advantageous in terms of correction of chromatic aberration. However, in the case of the typical glass material, the partial dispersion ratio increases, and a lot of axial secondary spectra occur over the entire zoom range.

It is more preferable to set the numerical values in Conditional Expressions (11) and (12) within the following ranges:

$$1.9 < N3n < 2.2 \quad (11a)$$

$$16 < v3n < 29 \quad (12a)$$

It is more preferable to set the numerical value in Conditional Expression (11a) within the following range:

$$1.95 < N3n < 2.16 \quad (11b)$$

It is preferable to satisfy the following condition:

$$1.5 < D2/D1 < 2.5 \quad (13)$$

where D1 and D2 respectively represent the thicknesses of the first lens unit L1 and the second lens unit L2 on the optical axis (distances between the lens surface closest to the object side and the lens surface closest to the image side in the first and second lens units L1 and L2).

Conditional Expression (13) specifies the thicknesses of the first lens unit L1 and the second lens unit L2 along the optical axis. In order to reduce the diameter of the foremost lens, it is generally preferable to reduce the distance from the aperture stop SP to the first lens unit L1 at the wide angle side.

In this case, size reduction and a high optical performance can be achieved by appropriately determining the thicknesses of the first lens unit L1 and the second lens unit L2. When the value is more than the upper limit and the thickness of the second lens unit L2 is too large compared with the thickness of the first lens unit L1, a sufficient air gap can be obtained in the second lens unit L2. Therefore, off-axis aberration can be easily corrected at the wide angle side. Unfortunately, the diameter of the foremost lens increases. When the value is less than the lower limit and the thickness of the second lens unit L2 is too small compared with the thickness of the first lens unit L1, the air gap in the second lens unit L2 is too small. Therefore, much curvature of field and astigmatism occur at the wide angle side.

It is more preferable to set the numerical value in Conditional Expression (13) within the following range:

$$1.6 < D2/D1 < 2.4 \qquad (13a)$$

By setting the above-described conditions in the embodiments, the zoom lens system can be properly corrected for aberrations over the entire zoom range while maintaining a high zoom ratio of about 5 and a wide image-taking viewing angle of 37 degrees.

A description will now be given of characteristics of lens configurations of the zoom lens units in the embodiments.

In the embodiments, during zooming, the first lens unit L1 is moved while forming a locus convex toward the image side so as to increase the distance between the first lens unit L1 and the second lens unit L2. Further, the second lens unit L2 is moved while forming a locus convex toward the image side so that the distance between the second lens unit L2 and the third lens unit L3 becomes shorter at the telephoto end than at the wide angle end. Moreover, the third lens unit L3 is moved toward the object side. Curvature of field resulting from zooming is compensated for by moving the fourth lens unit L4.

In the embodiments, the total length of the zoom lens system at the wide angle end is reduced to reduce the diameter of the foremost lens by moving the first lens unit L1 during zooming.

Further, the zooming effect is enhanced by changing the distance between the first lens unit L1 and the second lens unit L2 during zooming. In addition, the third lens unit L3 is moved toward the object side during zooming from the wide angle end to the telephoto end so that the distance between the third lens unit L3 and the fourth lens unit L4 becomes longer at the telephoto end than at the wide angle end. This allows the third lens unit L3 to share the zooming function.

Consequently, the zooming function served by changing the distance between the first lens unit L1 and the second lens unit L2 can be reduced, and the distance therebetween is reduced at the telephoto end. As a result, the total length of the zoom lens system is reduced at the telephoto side, and the diameter of the foremost lens is reduced.

The first lens unit L1 is formed by a cemented lens 13 composed of a negative lens element 11 and a positive lens element 12 that are arranged in that order from the object side to the image side. The first lens unit L1 has the smallest possible number of lens elements as an achromatic lens unit in order to properly correct longitudinal chromatic aberration and to reduce the size of the first lens unit L1.

The cemented lens 13 is shaped like a meniscus having a surface convex toward the object side so that the incident angle of off-axis rays on the lens surface decreases in order to reduce astigmatism.

The second lens unit L2 includes, from the object side to the image side, two negative lens elements 21 and 22 shaped like a meniscus having a concave surface on the image side, a negative lens element 23 having a concave surface on the object side, and a positive lens element 24 having a surface convex toward the object side.

In the fourth embodiment, the second lens unit L2 includes, from the object side to the image side, two negative lens elements 21 and 22 shaped like a meniscus having a concave surface on the image side, a positive lens element 23 having a surface convex toward the object side, and a negative lens element 24 having a concave surface on the object side.

In the embodiments, the negative refractive power of the second lens unit L2 is increased to some extent in order to reduce the size of the first lens unit L1 while maintaining a wide viewing angle (image-taking viewing angle) at the wide angle end. In this case, aberrations occur at the second lens unit L2. In particular, much curvature of field occurs on at wide angle side, and much spherical aberration occurs at the telephoto side.

Accordingly, in the embodiments of the present invention, these aberrations are reduced by sharing the negative refractive power of the second lens unit L2 by three negative lens elements and shaping the two negative lens element on the object side like a meniscus having a concave surface on the image side.

With this lens configuration, the diameter of the foremost lens is reduced and high optical performance is obtained while achieving a wide viewing angle.

The positive lens element 24 in the first to third embodiments and the positive lens element 23 in the fourth embodiment are formed of a high dispersion material having an Abbe number that is less than 20 and more than 15. This allows chromatic aberration to be corrected without increasing the refractive power of the positive lens element so much in the second lens unit L2. Therefore, there is no need to increase the refractive power of the three negative lens elements more than necessary, and aberrations at the lens elements can be reduced.

In order to increase the refractive power of the second lens unit L2, it is effective to form the positive lens element of such as a high dispersion material, as in the zoom lens systems of the embodiments. Further, the high dispersion material that forms the positive lens element has a refractive index more than 1.9. This reduces the thickness of the positive lens element.

The third lens unit L3 includes three-units defined by four lens elements, that is, includes, from the object side to the image side, a positive lens element 31, a cemented lens 35 of a positive lens element 32 and a negative lens element 33, and a positive lens element 34.

In the embodiments, the refractive power of the third lens unit L3 is increased to some extent in order to increase the zooming function of the third lens unit L3. In this case, aberrations occur at the third lens unit L3. In particular, spherical aberration, coma aberration, and longitudinal chromatic aberration often occur over the entire zooming range.

Accordingly, the positive refractive power of the third lens unit L3 is shared by three positive lens elements having a positive refractive power so as to reduce these aberrations.

In particular, spherical aberration and coma aberration are properly corrected by making both lens surfaces of the positive lens element 31 aspherical. It is preferable that the aspherical positive lens element 31 be shaped so that the positive refractive power decreases from the lens center toward the lens periphery. The cemented lens 35 has a convex surface on the object side and a concave surface on the image side. This can correct both spherical aberration and coma aberration.

The negative lens element 33 is formed of a material having a high refractive index more than 1.9. This can decrease the curvature of the lens surface on the image side and can reduce high-order coma aberration. Moreover, an image plane variation due to shift decentration of the third lens unit L3 can be reduced. The material of the negative lens element 33 is a high dispersion material having an Abbe number that is less than 30 and more than 15.

This structure allows chromatic aberration to be corrected without increasing the refractive power of the negative lens element 33 so much. Therefore, there is no need to increase the refractive powers of the three negative lens elements more than necessary, and aberrations at the lens elements can be reduced.

The positive lens element 34 closest to the image side in the third lens element L3 has a surface convex toward the image side so as to decrease the angle at which the off-axis principal ray is emitted from the image-side lens surface. This can reduce an image plane variation due to shift decentration of the third lens unit L3.

By thus forming the negative lens element 33 and the positive lens element 34, the third lens unit L3 is driven in a direction having a component perpendicular to the optical axis and to thereby reduce an image plane variation during motion blur correction (image stabilization). This allows motion blur to be easily corrected while maintaining a high optical performance.

The fourth lens unit L4 is formed by one positive lens element 41. In the embodiments, focusing is performed by moving the fourth lens unit L4. By thus making the lens unit compact and light, the driving torque for focusing can be reduced.

In order to reduce an image plane variation due to the change in object distance, it is preferable that the four lens unit L4 have a surface convex toward the object side. As the object distance changes, curvature of field caused at the first lens unit L1 changes. In order to cancel the change in curvature of field by focusing with the fourth lens unit L4 and to obtain a good image plane characteristic from the object at infinity to the near object, it is preferable that the fourth lens unit L4 have a surface convex toward the object side.

First to fourth numerical examples corresponding to the first to fourth embodiments of the present invention will be described below. In the numerical examples, i represents the order number of the optical surface from the object side, ri represents the radius of curvature of the i-th lens surface from the object side, di represents the lens thickness or air gap of the i-th lens surface from the object side, and ndi represents the refractive index of the i-th material from the object side for the d-line, and vdi represents the Abbe number (vd) of the material for the d-line. The Abbe number vd is given by the following expression:

$$vd = (Nd-1)/(NF-NC)$$

where Nd represents the refractive index for the d-line (wavelength: 587.6 nm), NF represents the refractive index for the F-line (wavelength: 486.1 nm), and NC represents the refractive index for the C-line (wavelength: 656.3 nm).

Table 1 shows the relationship between the above-described conditional expressions and the numerical examples.

The aspherical shape is given by the following expression:

$$X = \frac{(1/R)H^2}{1+\sqrt{1-(1+K)(H/R)^2}} + A4 \times H^4 + A6 \times H^6 + A8 \times H^8$$

where the X-axis indicates the optical axis direction, the H-axis indicates the direction perpendicular to the optical axis, the light traveling direction is the positive direction, R represents the paraxial radius of curvature, K is a conic constant, and A4, A6, and A8 are aspherical coefficients.

In the values of the aspherical coefficients, for example, "E-Z" means "$10^{-Z}$". In the numerical examples, the last two surfaces (twenty-third and twenty-fourth surfaces) constitute the optical block G.

BF represents the back focus serving as an equivalent air length from the final surface of the zoom lens system to a paraxial image plane. The total lens length refers to the sum of the distance between the foremost lens surface to the final lens surface, and the back focus. The surface number of the aspherical surface is noted with an asterisk "*".

First Numerical Example

| Unit mm | | | | |
|---|---|---|---|---|
| Surface data | | | | |
| Surface No. | r | d | nd | vd |
| 1 | 27.364 | 1.20 | 1.84666 | 23.9 |
| 2 | 20.088 | 4.00 | 1.77250 | 49.6 |
| 3 | 66.608 | (variable) | | |
| 4 | 21.154 | 0.95 | 1.88300 | 40.8 |
| 5 | 7.854 | 2.52 | | |
| 6 | 17.211 | 0.90 | 1.88300 | 40.8 |
| 7 | 8.731 | 3.14 | | |
| 8 | −24.403 | 0.80 | 1.80400 | 46.6 |
| 9 | 166.576 | 0.20 | | |
| 10 | 16.917 | 1.80 | 1.92286 | 18.9 |
| 11 | 94.775 | (variable) | | |
| 12 (stop) | ∞ | 1.50 | | |
| 13* | 12.089 | 2.20 | 1.58313 | 59.4 |
| 14* | −21.698 | 0.20 | | |
| 15 | 6.003 | 2.40 | 1.48749 | 70.2 |
| 16 | 13.648 | 0.70 | 2.00069 | 25.5 |
| 17 | 5.537 | 1.46 | | |
| 18 | −19.438 | 1.20 | 1.48749 | 70.2 |
| 19 | −10.131 | 0.50 | | |
| 20 flare-cut stop | ∞ | (variable) | | |
| 21 | 15.301 | 2.00 | 1.48749 | 70.2 |
| 22 | 109.326 | (variable) | | |
| 23 | ∞ | 1.10 | 1.51633 | 64.1 |
| 24 | ∞ | (variable) | | |
| Image Plane | ∞ | | | |

| Aspherical Surface Data |
|---|
| 13-th Surface |

K = 1.43178e+000   A4 = −2.01411e−004   A6 = −1.69744e−006
A8 = 2.82246e−008

-continued

Unit mm 14-th surface

K = −6.18021e−001    A4 = 1.13642e−004    A6 = −6.70660e−007
A8 = 5.94851e−008

Various Data
Zoom Ratio 4.81

|  | Wide Angle | Intermediate | Telephoto |
|---|---|---|---|
| Focal Length | 6.22 | 13.52 | 29.89 |
| F-number | 2.88 | 3.49 | 4.57 |
| Viewing Angle | 36.78 | 18.97 | 8.84 |
| Image Height | 4.65 | 4.65 | 4.65 |
| Lens Length | 57.13 | 59.56 | 76.99 |
| BF | 6.90 | 11.59 | 10.32 |
| d3 | 0.30 | 8.78 | 20.58 |
| d11 | 17.49 | 6.04 | 2.08 |
| d20 | 4.77 | 5.49 | 16.35 |
| d22 | 5.58 | 10.26 | 8.99 |
| d24 | 0.60 | 0.60 | 0.60 |

Zoom Lens Unit Data

| Unit | First Surface | Focal Length |
|---|---|---|
| 1 | 1 | 59.97 |
| 2 | 4 | −8.99 |
| 3 | 12 | 13.91 |
| 4 | 21 | 36.24 |
| 5 | 23 | ∞ |

Second Numerical Example

Unit mm

Surface Data

| Surface No. | r | d | nd | vd |
|---|---|---|---|---|
| 1 | 25.682 | 1.20 | 1.84666 | 23.9 |
| 2 | 18.458 | 4.50 | 1.77250 | 49.6 |
| 3 | 66.212 | (variable) | | |
| 4 | 22.150 | 0.95 | 1.88300 | 40.8 |
| 5 | 6.817 | 2.82 | | |
| 6 | 14.908 | 0.90 | 1.88300 | 40.8 |
| 7 | 7.381 | 2.25 | | |
| 8 | −41.401 | 0.80 | 1.80400 | 46.6 |
| 9 | 32.321 | 0.20 | | |
| 10 | 12.019 | 1.80 | 1.94595 | 18.0 |
| 11 | 38.931 | (variable) | | |
| 12 (stop) | ∞ | 1.50 | | |
| 13* | 11.453 | 2.20 | 1.58313 | 59.4 |
| 14* | −15.809 | 0.20 | | |
| 15 | 5.760 | 2.40 | 1.48749 | 70.2 |
| 16 | 29.150 | 0.70 | 2.00330 | 28.3 |
| 17 | 5.668 | 1.44 | | |
| 18 | −18.717 | 1.20 | 1.48749 | 70.2 |
| 19 | −8.682 | 0.50 | | |
| 20 flare-cut stop | ∞ | (variable) | | |
| 21 | 15.537 | 2.00 | 1.48749 | 70.2 |
| 22 | 772.512 | (variable) | | |
| 23 | ∞ | 1.10 | 1.51633 | 64.1 |
| 24 | ∞ | (variable) | | |
| Image Plane | ∞ | | | |

Aspherical Surface Data 13-th Surface

K = 2.02711e+000    A4 = −2.51997e−004    A6 = 2.64914e−006
A8 = −3.89547e−008

-continued

Unit mm 14-th Surface

K = 1.21663e−001    A4 = 2.24871e−004    A6 = 5.72449e−006
A8 = 3.73190e−008

Various Data
Zoom Ratio 4.91

|  | Wide Angle | Intermediate | Telephoto |
|---|---|---|---|
| Focal Length | 6.09 | 13.83 | 29.88 |
| F-number | 2.88 | 3.69 | 4.96 |
| Viewing Angle | 37.37 | 18.58 | 8.84 |
| Image Height | 4.65 | 4.65 | 4.65 |
| Lens Length | 52.41 | 57.32 | 77.23 |
| BF | 5.78 | 12.88 | 9.75 |
| d3 | 0.30 | 8.15 | 19.33 |
| d11 | 12.91 | 3.61 | 1.81 |
| d20 | 5.86 | 5.12 | 18.79 |
| d22 | 4.46 | 11.56 | 8.42 |
| d24 | 0.60 | 0.60 | 0.60 |

Zoom Lens Unit Data

| Unit | First Surface | Focal Length |
|---|---|---|
| 1 | 1 | 54.12 |
| 2 | 4 | −7.00 |
| 3 | 12 | 12.24 |
| 4 | 21 | 32.50 |
| 5 | 23 | ∞ |

Third Numerical Example

Unit mm

Surface Data

| Surface No. | r | d | nd | vd |
|---|---|---|---|---|
| 1 | 29.262 | 1.20 | 1.84666 | 23.9 |
| 2 | 21.632 | 3.60 | 1.77250 | 49.6 |
| 3 | 63.618 | (variable) | | |
| 4 | 17.756 | 0.95 | 1.88300 | 40.8 |
| 5 | 7.797 | 2.62 | | |
| 6 | 17.816 | 0.90 | 1.88300 | 40.8 |
| 7 | 8.843 | 3.07 | | |
| 8 | −25.139 | 0.80 | 1.80400 | 46.6 |
| 9 | 536.548 | 0.20 | | |
| 10 | 16.555 | 1.80 | 2.14352 | 17.8 |
| 11 | 38.838 | (variable) | | |
| 12 (Stop) | ∞ | 1.50 | | |
| 13* | 12.201 | 2.20 | 1.58313 | 59.4 |
| 14* | −30.548 | 0.20 | | |
| 15 | 6.330 | 2.40 | 1.48749 | 70.2 |
| 16 | 8.381 | 0.70 | 2.14352 | 17.8 |
| 17 | 5.606 | 1.31 | | |
| 18 | −35.476 | 1.20 | 1.48749 | 70.2 |
| 19 | −12.592 | 0.50 | | |
| 20 flare-cut stop | ∞ | (variable) | | |
| 21 | 16.866 | 2.00 | 1.48749 | 70.2 |
| 22 | 129.586 | (variable) | | |
| 23 | ∞ | 1.10 | 1.51633 | 64.1 |
| 24 | ∞ | (variable) | | |
| Image Plane | ∞ | | | |

Aspherical Surface Data 13-th Surface

K = 9.17559e−001    A4 = −7.37681e−005    A6 = −4.55229e−007
A8 = 2.66544e−007

-continued

Unit mm 14-th Surface

K = 1.23791e+000   A4 = 1.85426e−004   A6 = 4.01899e−007
A8 = 3.20737e−007

Various Data
Zoom Ratio 4.74

|  | Wide Angle | Intermediate | Telephoto |
|---|---|---|---|
| Focal Length | 6.30 | 13.72 | 29.88 |
| F-number | 2.88 | 3.62 | 4.83 |
| Viewing Angle | 36.42 | 18.71 | 8.84 |
| Image Height | 4.65 | 4.65 | 4.65 |
| Lens Length | 57.28 | 60.64 | 79.00 |
| BF | 6.00 | 11.03 | 10.58 |
| d3 | 0.30 | 9.97 | 22.96 |
| d11 | 17.88 | 6.09 | 1.80 |
| d20 | 5.95 | 6.40 | 16.52 |
| d22 | 4.67 | 9.71 | 9.25 |
| d24 | 0.60 | 0.60 | 0.60 |

Zoom Lens Unit Data

| Unit | First Surface | Focal Length |
|---|---|---|
| 1 | 1 | 70.00 |
| 2 | 4 | −9.44 |
| 3 | 12 | 13.61 |
| 4 | 21 | 39.54 |
| 5 | 23 | ∞ |

Fourth Numerical Example

Unit mm

Surface Data

| Surface No. | r | d | nd | vd |
|---|---|---|---|---|
| 1 | 28.038 | 1.20 | 1.84666 | 23.9 |
| 2 | 22.236 | 4.00 | 1.60311 | 60.6 |
| 3 | 148.408 | (variable) | | |
| 4 | 21.448 | 0.95 | 1.88300 | 40.8 |
| 5 | 7.219 | 4.45 | | |
| 6 | 68.955 | 0.90 | 1.88300 | 40.8 |
| 7 | 12.592 | 1.60 | | |
| 8 | 11.919 | 1.80 | 1.92286 | 18.9 |
| 9 | 28.100 | 1.00 | | |

-continued

Unit mm

| 10 | −50.000 | 0.80 | 1.80400 | 46.6 |
|---|---|---|---|---|
| 11 | 7993.949 | (variable) | | |
| 12 (Stop) | ∞ | 1.50 | | |
| 13* | 10.472 | 2.20 | 1.58313 | 59.4 |
| 14* | −19.990 | 0.20 | | |
| 15 | 6.153 | 2.40 | 1.48749 | 70.2 |
| 16 | 13.839 | 0.70 | 2.00069 | 25.5 |
| 17 | 5.481 | 1.47 | | |
| 18 | −20.390 | 1.20 | 1.48749 | 70.2 |
| 19 | −11.660 | 0.50 | | |
| 20 flare-cut stop | ∞ | (variable) | | |
| 21 | 18.000 | 2.00 | 1.48749 | 70.2 |
| 22 | 187.114 | (variable) | | |
| 23 | ∞ | 0.60 | 1.51633 | 64.1 |
| 24 | ∞ | (variable) | | |
| Image Plane | ∞ | | | |

Aspherical Surface Data 13-th Surface

K = 1.11586e+000   A4 = −1.18995e−004   A6 = −2.40460e−006
A8 = 5.54405e−007

14-th Surface

K = −6.28423e+000   A4 = 1.87183e−004   A6 = −3.58591e−007
A8 = 6.88720e−007

Various Data
Zoom Ratio 4.70

|  | Wide Angle | Intermediate | Telephoto |
|---|---|---|---|
| Focal Length | 6.36 | 13.75 | 29.87 |
| F-number | 2.88 | 3.58 | 4.77 |
| Viewing Angle | 36.18 | 18.68 | 8.84 |
| Image Height | 4.65 | 4.65 | 4.65 |
| Lens Length | 56.75 | 59.67 | 77.58 |
| BF | 4.89 | 11.61 | 10.59 |
| d3 | 0.30 | 9.36 | 21.75 |
| d11 | 16.38 | 5.22 | 1.56 |
| d20 | 6.31 | 4.61 | 14.82 |
| d22 | 3.90 | 10.61 | 9.60 |
| d24 | 0.60 | 0.60 | 0.60 |

Zoom Lens Unit Data

| Unit | First Surface | Focal Length |
|---|---|---|
| 1 | 1 | 63.81 |
| 2 | 4 | −8.77 |
| 3 | 12 | 12.98 |
| 4 | 21 | 40.70 |
| 5 | 23 | ∞ |

TABLE 1

|  | First Example | Second Example | Third Example | Fourth Example |
|---|---|---|---|---|
| Conditional Expression (1) | 9.65 | 8.89 | 11.11 | 10.04 |
| Conditional Expression (2) | 1.45 | 1.15 | 1.50 | 1.38 |
| Conditional Expression (3) | 3.19 | 4.08 | 3.45 | 3.28 |
| Conditional Expression (4) | 2.24 | 2.01 | 2.16 | 2.04 |
| Conditional Expression (5) | 5.83 | 5.34 | 6.28 | 6.40 |
| Conditional Expression (6) | 0.45 | 0.39 | 0.38 | 0.39 |
| Conditional Expression (7) | −2.39 | −2.27 | −2.70 | −1.47 |
| Conditional Expression (8) | −1.33 | −1.04 | −1.30 | −1.21 |
| Conditional Expression (9) | 1.92286 | 1.94595 | 2.14352 | 1.92286 |
| Conditional Expression (10) | 18.9 | 18.0 | 17.8 | 18.9 |
| Conditional Expression (11) | 2.00069 | 2.00330 | 2.14352 | 2.00069 |
| Conditional Expression (12) | 25.5 | 28.3 | 17.8 | 25.5 |
| Conditional Expression (13) | 1.98 | 1.71 | 2.15 | 2.21 |

A digital still camera using the zoom lens system according to any of the embodiments as an image-taking optical system will now be described with reference to FIG. 17.

Referring to FIG. 17, the digital still camera includes a camera body 20, an image-taking optical system 21 formed by the zoom lens system according to any of the above-described first to fourth embodiments, a solid-state image pickup element (photoelectric conversion element) 22, such as a CCD sensor or a CMOS sensor, a memory 23, and a finder 24. The solid-state image pickup element 22 is incorporated in the camera body 20, and receives an optical subject image formed by the image-taking optical system 21. The memory 23 stores information about the subject image photoelectrically converted by the solid-state image pickup element 22. The finder 24 is formed by, for example, a liquid crystal display panel, and allows the subject image formed on the solid-state image pickup element 22 to be viewed therethrough.

By thus applying the zoom lens system according to any of the embodiments of the present invention to the image pickup apparatus such as a digital still camera, it is possible to realize a compact image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-067546 filed Mar. 17, 2008, which is hereby incorporated by reference herein in its entirety.

What is claimed is:

1. A zoom lens system comprising in order from an object side to an image side:

a first lens unit having a positive optical power, the first lens unit consisting of a positive lens element and a negative lens element;

a second lens unit having a negative optical power, the second lens unit consisting of three negative lens elements and a positive lens element;

a third lens unit having a positive optical power; and a fourth lens unit having a positive optical power, wherein a distance between the first lens unit and the second lens unit is longer at a telephoto end than at a wide angle end, a distance between the second lens unit and the third lens unit is shorter at the telephoto end than at the wide angle end, and a distance between the third lens unit and the fourth lens unit is different at the wide angle end and at the telephoto end, and wherein the following conditions are satisfied:

$$8.0 < f1/fw < 13.0$$

$$1.0 < |f2|/fw < 1.7$$

where fw represents a focal length of the zoom lens system at the wide angle end, f1 represents a focal length of the first lens unit, and f2 represents a focal length of the second lens unit.

2. The zoom lens system according to claim 1, wherein the following condition is satisfied:

$$2.0 < m1/fw < 5.0$$

where m1 represents a distance between a position of the first lens unit in an optical axis direction at the wide angle end and a position of the first lens element in the optical axis direction at the telephoto end.

3. The zoom lens system according to claim 1, wherein the following condition is satisfied:

$$1.5 < f3/fw < 2.7$$

where f3 represents a focal length of the third lens unit.

4. The zoom lens system according to claim 1, wherein the following condition is satisfied:

$$4.0 < f4/fw < 7.0$$

where f4 represents a focal length of the fourth lens unit.

5. The zoom lens system according to claim 1, wherein the third lens unit includes a positive lens element that is provided closest to the image side and that has a surface convex toward the image side.

6. The zoom lens system according to claim 1, wherein the following condition is satisfied:

$$0.2 < |\beta2w|/(1/(ft/fw)^{-1/2}) < 0.6$$

where $\beta2w$ represents a lateral magnification of the second lens unit at the wide angle end, and ft represents a focal length of the zoom lens system at the telephoto end.

7. The zoom lens system according to claim 1, wherein the positive lens element and the negative lens element in the first lens unit constitute a cemented lens, and wherein the following condition is satisfied:

$$-3.0 < (R1a+R1b)/(R1a-R1b) < -1.0$$

where R1a and R1b respectively represent radii of curvature of a lens surface closest to the object side and a lens surface closest to the image side in the first lens unit.

8. The zoom lens system according to claim 1, wherein the fourth lens unit consists of a positive lens element, and wherein the following condition is satisfied:

$$-1.6 < (R4a+R4b)/(R4a-R4b) < -1.0$$

where R4a and R4b respectively represent radii of curvature of a lens surface closest to the object side and a lens surface closest to the image side in the fourth lens unit.

9. The zoom lens system according to claim 1, wherein the following conditions are satisfied:

$$1.9 < N2p$$

$$15 < v2p < 20$$

where N2p and v2p respectively represent a refractive index and an Abbe number of a material of the positive lens element in the second unit.

10. The zoom lens system according to claim 1, wherein the third lens unit includes a negative lens element that satisfies the following conditions:

$$1.9 < N3n$$

$$15 < v3n < 30$$

where N3n and v3n respectively represents a refractive index and an Abbe number of a material of the negative lens element.

11. The zoom lens system according to claim 1, wherein the following condition is satisfied:

$$1.5 < D2/D1 < 2.5$$

where D1 and D2 respectively represent thicknesses of the first lens unit and the second lens unit in the optical axis direction.

12. The zoom lens system according to claim 1, wherein, during zooming from the wide angle end to the telephoto end, the first lens unit moves while forming a locus convex toward the image side, the second lens unit moves while forming a locus convex toward the image side, the third lens unit moves to the object side, and the fourth lens unit moves while forming a locus convex toward the object side, and wherein a position of the first lens unit in the optical axis direction at the telephoto end is closer to the object side than a position of the first lens unit in the optical axis direction at the wide angle end.

13. A camera comprising:

the zoom lens system according to claim 1; and a solid-state image pickup element configured to receive an optical image formed by the zoom lens system.

* * * * *